(12) United States Patent
Crane

(10) Patent No.: US 12,497,089 B1
(45) Date of Patent: Dec. 16, 2025

(54) DELAYED-ACTION COLLAPSIBLE STROLLER DEVICE

(71) Applicant: Jamie Crane, Mountain View, CA (US)

(72) Inventor: Jamie Crane, Mountain View, CA (US)

( * ) Notice: Subject to any disclaimer, the term of this patent is extended or adjusted under 35 U.S.C. 154(b) by 0 days.

(21) Appl. No.: 19/217,133

(22) Filed: May 23, 2025

(51) Int. Cl.
| | | |
|---|---|---|
| *B62B 7/10* | (2006.01) | |
| *B62B 7/08* | (2006.01) | |
| *B62B 9/08* | (2006.01) | |
| *B62B 9/14* | (2006.01) | |
| *B62B 9/24* | (2006.01) | |

(52) U.S. Cl.
CPC .............. *B62B 7/10* (2013.01); *B62B 7/08* (2013.01); *B62B 9/082* (2013.01); *B62B 9/087* (2013.01); *B62B 9/14* (2013.01); *B62B 9/24* (2013.01)

(58) Field of Classification Search
CPC ....... B62B 2205/003; B62B 7/08; B62B 7/06; B62B 7/062; B62B 7/068; B62B 7/10
See application file for complete search history.

(56) References Cited

U.S. PATENT DOCUMENTS

| | | | | |
|---|---|---|---|---|
| 6,886,839 B2 * | 5/2005 | Everett | .................... | F16B 7/042 280/47.38 |
| 7,051,853 B2 * | 5/2006 | Brown | ....................... | B62B 7/06 280/37 |
| 7,229,091 B2 * | 6/2007 | Lan | .......................... | B62B 7/10 280/47.38 |
| 7,311,323 B1 * | 12/2007 | Lan | .......................... | B62B 7/10 280/32.6 |
| 7,441,794 B2 * | 10/2008 | Lan | ......................... | B62B 7/142 280/47.38 |
| 7,571,926 B2 * | 8/2009 | Huang | .................... | B62B 7/083 280/647 |
| 8,585,076 B2 * | 11/2013 | Thorne | ..................... | B62B 7/08 280/658 |
| 9,056,622 B2 * | 6/2015 | Thomas | .................. | B62B 7/008 |
| 9,849,902 B1 * | 12/2017 | Liao | .......................... | B62B 7/08 |
| 9,988,065 B2 * | 6/2018 | Ruggiero | ................. | B62B 9/18 |
| 10,286,940 B2 * | 5/2019 | Chen | .......................... | B62B 7/08 |
| 10,752,278 B2 * | 8/2020 | Canas | ....................... | F16F 3/04 |
| 11,332,180 B2 * | 5/2022 | Crumrine | ............... | B62B 7/086 |
| 11,358,623 B2 * | 6/2022 | Zhong | ........................ | B62B 7/10 |
| 2014/0339038 A1 * | 11/2014 | Welker | ................. | A45C 13/385 280/35 |

(Continued)

FOREIGN PATENT DOCUMENTS

| | | | | |
|---|---|---|---|---|
| CN | 108313115 A | * | 7/2018 | ............... B62B 7/10 |
| DE | 202010001976 U1 | * | 5/2010 | ............... B62B 7/10 |

(Continued)

*Primary Examiner* — Emma K Frick
(74) *Attorney, Agent, or Firm* — Pharar Patents & Intellectual Property; Andrew A. Pharar

(57) ABSTRACT

The delayed-action collapsible stroller device may be simple to operate, compact when folded, and robust and reliable during both use and storage. Such a device may further comprise a delayed-action folding mechanism to maximize its compactness when folded, and may further comprise advanced locking mechanisms to enhance its structural rigidity and ability to carry heavier users. The delayed-action collapsible stroller device may further comprise standardized mounting points and a plurality of accessories to enhance its functionality.

17 Claims, 30 Drawing Sheets

(56) References Cited

U.S. PATENT DOCUMENTS

2023/0182800 A1* 6/2023 Sun .................... B62B 9/082
                                                    280/65

FOREIGN PATENT DOCUMENTS

| EP | 1059075 A2 | * | 12/2000 | ............ | A61G 5/107 |
| JP | H09240481 A | * | 9/1997 | | |
| SE | 300672 B | * | 5/1968 | ............ | A61G 5/128 |

* cited by examiner

DELAYED-ACTION COLLAPSIBLE STROLLER DEVICE

TECHNICAL FIELD OF THE INVENTION

The present invention relates in general to stroller devices, and, more specifically, to a delayed-action collapsible stroller device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Strollers are essential devices for transporting infants and young children, providing caregivers with a convenient and safe way to move children over various distances. Over the years, a variety of stroller designs have emerged, ranging from simple four-wheel carts to more advanced models featuring adjustable seating, storage compartments, and weather protection features. Among the most sought-after innovations in this space is the collapsible stroller, which offers enhanced portability and storage convenience.

Traditional collapsible strollers generally employ hinged frames or sliding joints that allow the structure to fold into a more compact form. While these designs serve their intended purpose, they often present limitations, including cumbersome folding mechanisms, excessive bulk even when folded, difficulty in one-handed operation, and a lack of structural stability during use or transport. Additionally, many collapsible strollers require multiple steps or significant force to transition between the deployed and collapsed states, which can be inconvenient or even unsafe, particularly when the caregiver is handling a child simultaneously.

Furthermore, existing collapsible stroller designs may compromise on ergonomic considerations, overall durability, or the ability to accommodate accessories without hindering the folding mechanism. As modern caregivers increasingly demand products that combine functionality, ease of use, and compactness, there is a need for improved collapsible stroller systems that address the shortcomings of current models while maintaining or enhancing safety and comfort features.

Thus, there is a need in the art for a delayed-action collapsible stroller device that may be simple to operate, compact when folded, and robust and reliable during both use and storage. Such a device may further comprise a delayed-action folding mechanism to maximize its compactness when folded, and may further comprise advanced locking mechanisms to enhance its structural rigidity and ability to carry heavier users. The delayed-action collapsible stroller device may further comprise standardized mounting points and a plurality of accessories to enhance its functionality. It is to these ends that the present invention has been developed.

BRIEF SUMMARY OF THE INVENTION

To minimize the limitations in the prior art, and to minimize other limitations that will be apparent upon reading and understanding the present specification, the present invention describes a delayed-action collapsible stroller device.

It is an objective of the present invention to provide a delayed-action collapsible stroller device that may comprise a baby stroller.

It is another objective of the present invention to provide a delayed-action collapsible stroller device that may comprise a main body.

It is another objective of the present invention to provide a delayed-action collapsible stroller device that may comprise a frame.

It is another objective of the present invention to provide a delayed-action collapsible stroller device that may comprise a front truck.

It is another objective of the present invention to provide a delayed-action collapsible stroller device that may comprise a rear truck.

It is another objective of the present invention to provide a delayed-action collapsible stroller device that may comprise a top arm.

It is another objective of the present invention to provide a delayed-action collapsible stroller device that may comprise a handle bar.

It is another objective of the present invention to provide a delayed-action collapsible stroller device that may comprise an upper pivot.

It is another objective of the present invention to provide a delayed-action collapsible stroller device that may comprise a mid arm.

It is another objective of the present invention to provide a delayed-action collapsible stroller device that may comprise a lower pivot.

It is another objective of the present invention to provide a delayed-action collapsible stroller device that may comprise a connecting arm.

It is another objective of the present invention to provide a delayed-action collapsible stroller device that may comprise a front pivot.

It is another objective of the present invention to provide a delayed-action collapsible stroller device that may comprise a mid pivot.

It is another objective of the present invention to provide a delayed-action collapsible stroller device that may comprise a fixed arm.

It is another objective of the present invention to provide a delayed-action collapsible stroller device that may comprise a rear pivot.

It is another objective of the present invention to provide a delayed-action collapsible stroller device that may comprise a seat frame.

It is another objective of the present invention to provide a delayed-action collapsible stroller device that may comprise an atlas.

It is another objective of the present invention to provide a delayed-action collapsible stroller device that may comprise a front crossbar.

It is another objective of the present invention to provide a delayed-action collapsible stroller device that may comprise a front arm.

It is another objective of the present invention to provide a delayed-action collapsible stroller device that may comprise a rear arm.

It is another objective of the present invention to provide a delayed-action collapsible stroller device that may comprise a rear axle.

It is another objective of the present invention to provide a delayed-action collapsible stroller device that may comprise a rear crossbar.

It is another objective of the present invention to provide a delayed-action collapsible stroller device that may comprise a locking bar.

It is another objective of the present invention to provide a delayed-action collapsible stroller device that may comprise a foot brake.

It is another objective of the present invention to provide a delayed-action collapsible stroller device that may comprise a pull rod.

It is another objective of the present invention to provide a delayed-action collapsible stroller device that may comprise a rod housing.

It is another objective of the present invention to provide a delayed-action collapsible stroller device that may comprise a piston.

It is another objective of the present invention to provide a delayed-action collapsible stroller device that may comprise a spring.

It is another objective of the present invention to provide a delayed-action collapsible stroller device that may comprise a stopper.

It is another objective of the present invention to provide a delayed-action collapsible stroller device that may comprise a frame lock.

It is another objective of the present invention to provide a delayed-action collapsible stroller device that may comprise a linkage.

It is another objective of the present invention to provide a delayed-action collapsible stroller device that may comprise a slide block.

It is another objective of the present invention to provide a delayed-action collapsible stroller device that may comprise a cam.

It is another objective of the present invention to provide a delayed-action collapsible stroller device that may comprise a latch.

It is another objective of the present invention to provide a delayed-action collapsible stroller device that may comprise a lock cover.

It is another objective of the present invention to provide a delayed-action collapsible stroller device that may comprise a resilient material of construction.

It is another objective of the present invention to provide a delayed-action collapsible stroller device that may comprise a water-proof material of construction.

It is another objective of the present invention to provide a delayed-action collapsible stroller device that may comprise a reusable material of construction.

It is another objective of the present invention to provide a delayed-action collapsible stroller device that may comprise a washable material of construction.

It is another objective of the present invention to provide a delayed-action collapsible stroller device that may comprise a multi-component construction.

It is another objective of the present invention to provide a delayed-action collapsible stroller device that may comprise an antimicrobial layer.

It is another objective of the present invention to provide a delayed-action collapsible stroller device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The delayed-action collapsible stroller device may be simple to operate, compact when folded, and robust and reliable during both use and storage. Such a device may further comprise a delayed-action folding mechanism to maximize its compactness when folded, and may further comprise advanced locking mechanisms to enhance its structural rigidity and ability to carry heavier users. The delayed-action collapsible stroller device may further comprise standardized mounting points and a plurality of accessories to enhance its functionality.

Figure 1:
FIG. 1 is a front isometric perspective view of a delayed-action collapsible stroller device with all accessories, as contemplated by the present disclosure.
Figure 2:
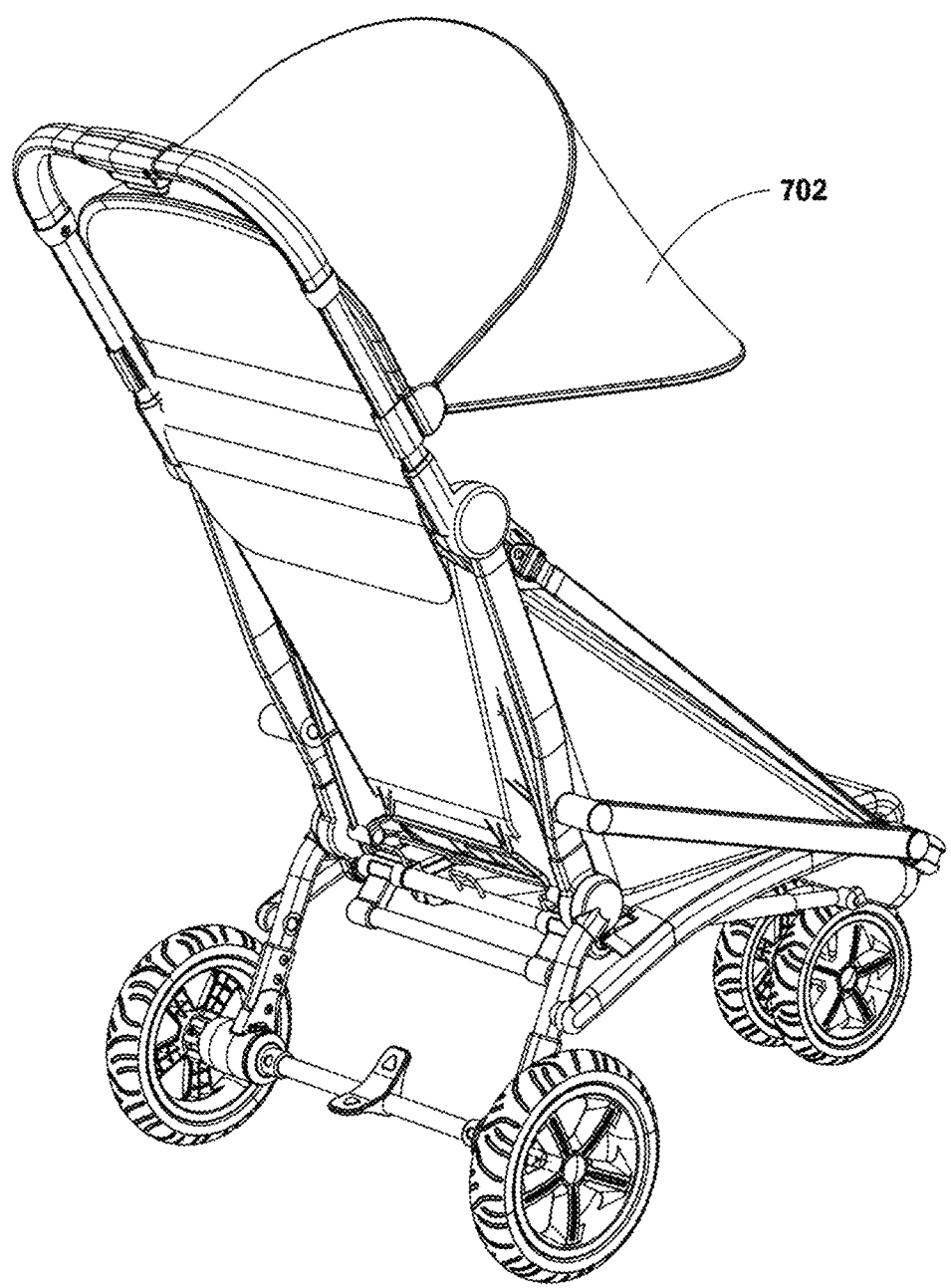
FIG. 2 is a rear isometric perspective view of a delayed-action collapsible stroller device with all accessories, as contemplated by the present disclosure.
Figure 3:
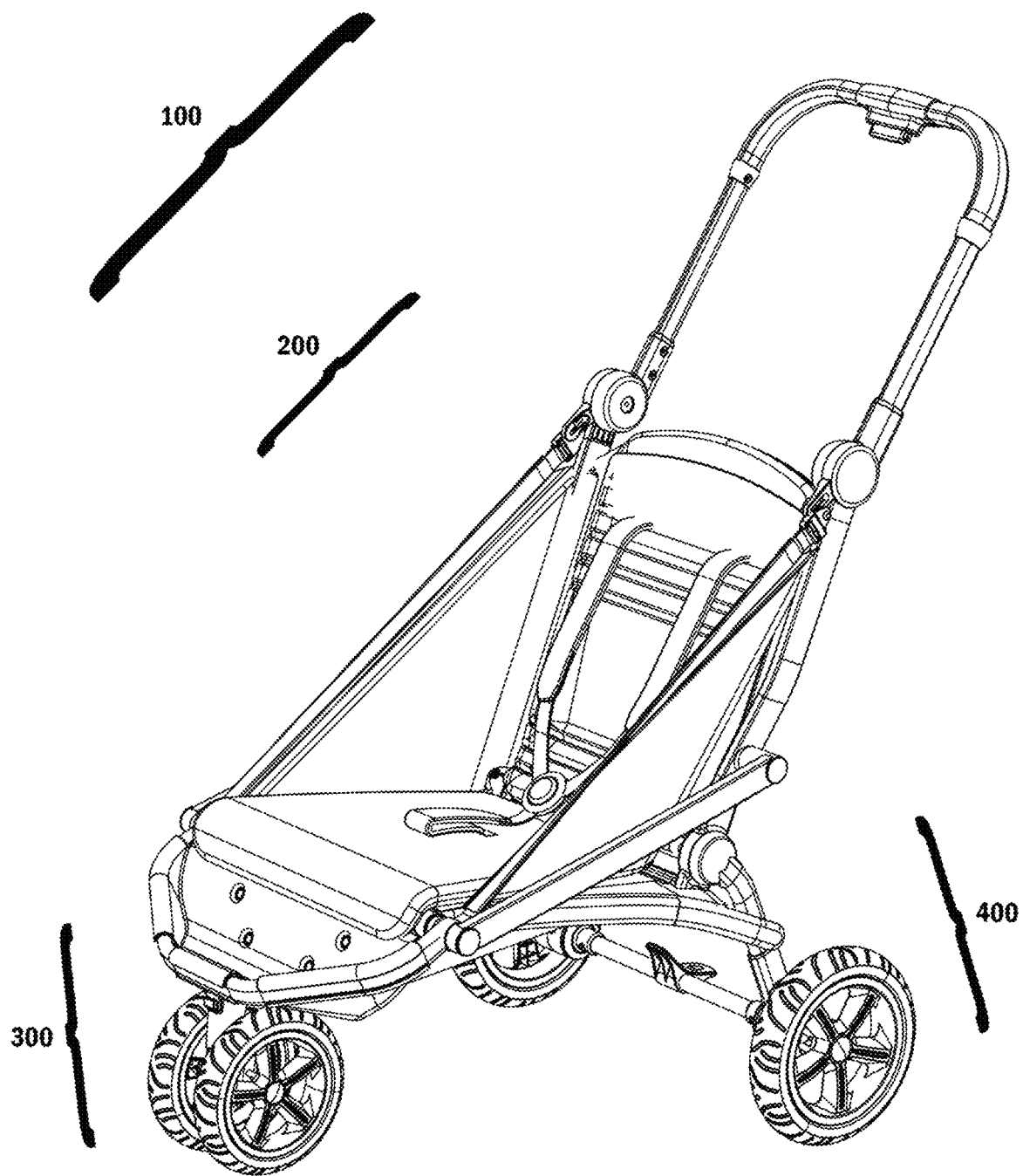
FIG. 3 is a front isometric perspective view of a delayed-action collapsible stroller device with some accessories, as contemplated by the present disclosure.
Figure 4:
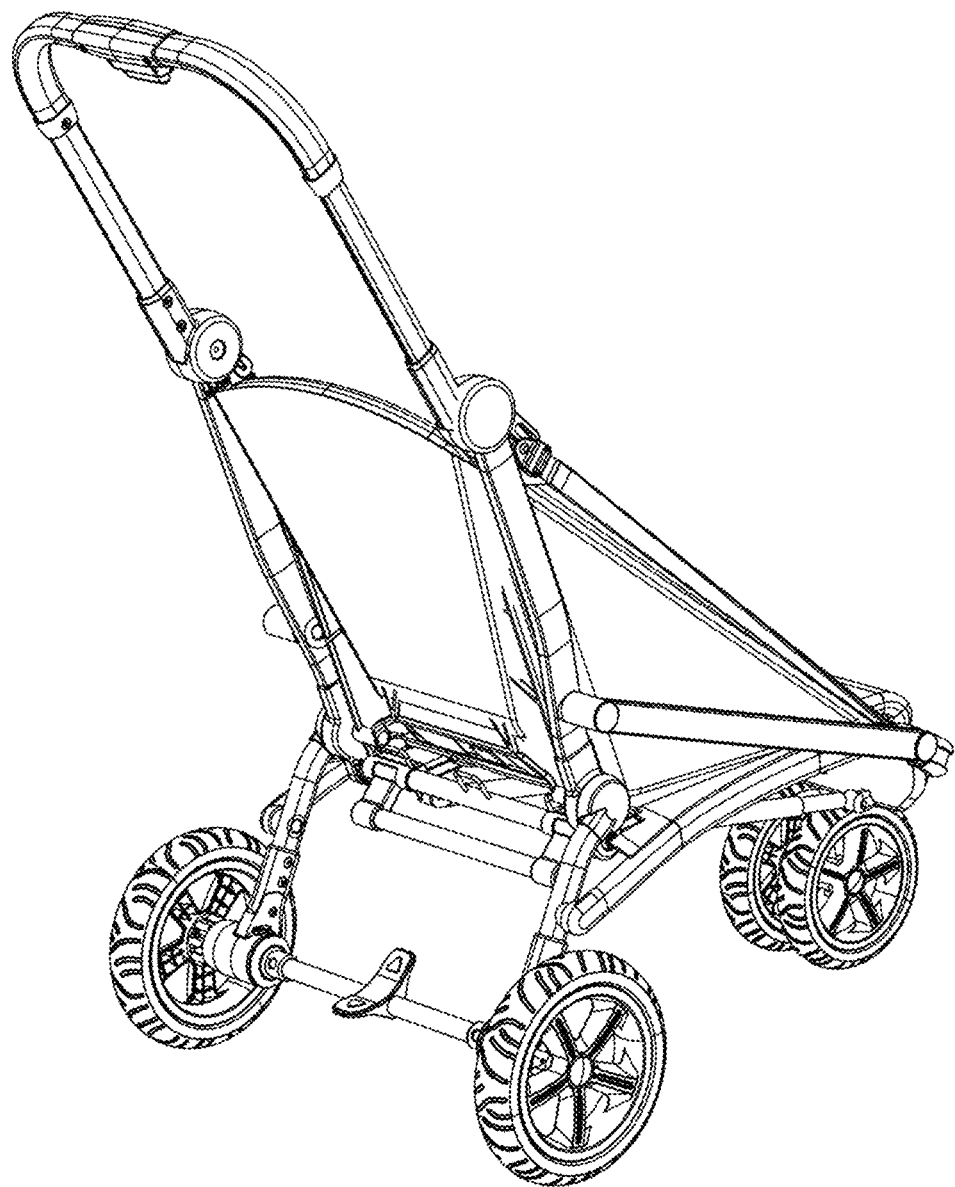
FIG. 4 is a rear isometric perspective view of a delayed-action collapsible stroller device with some accessories, as contemplated by the present disclosure.
Figure 5:
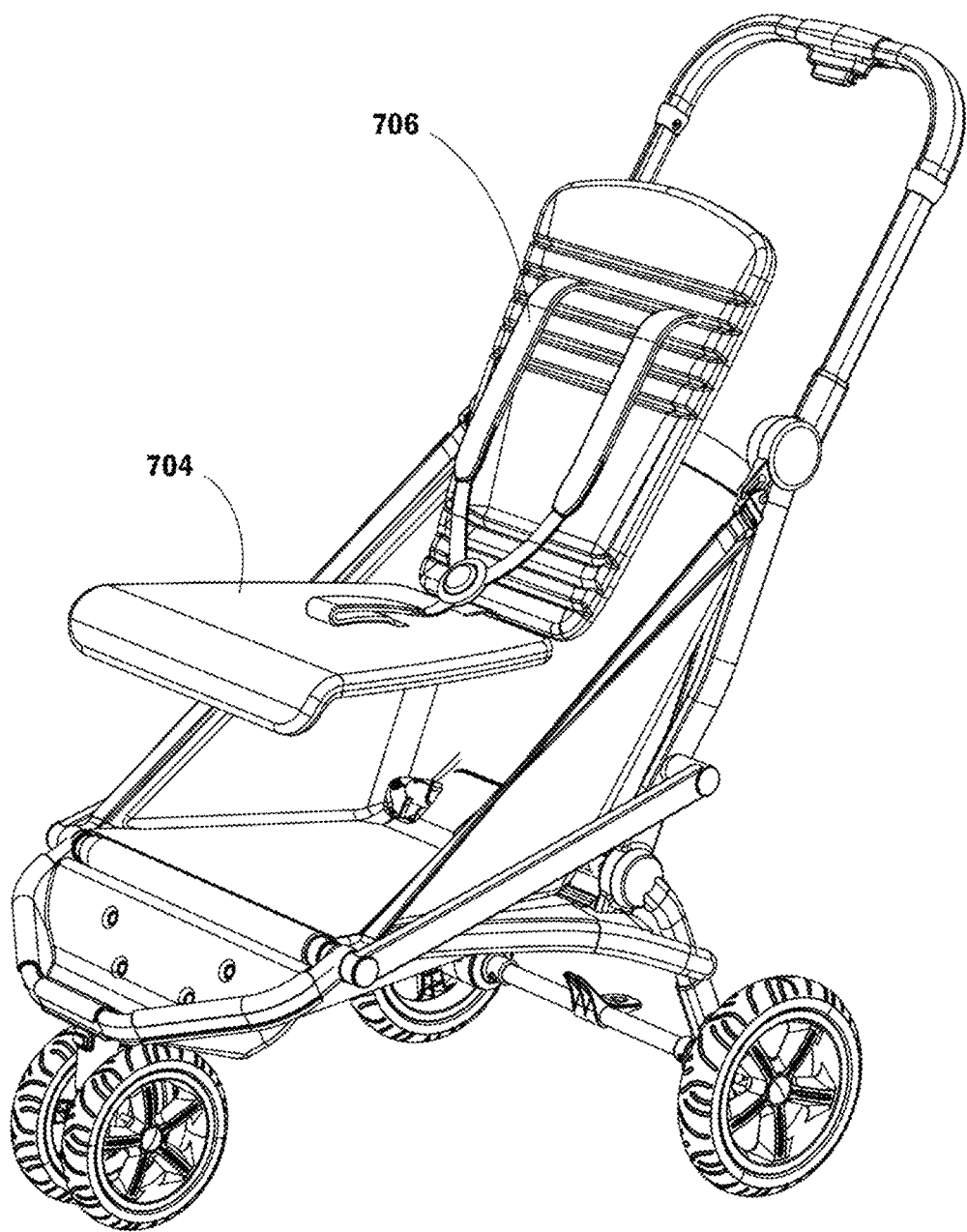
FIG. 5 is a front isometric perspective view of a delayed-action collapsible stroller device, as contemplated by the present disclosure.
Figure 6:
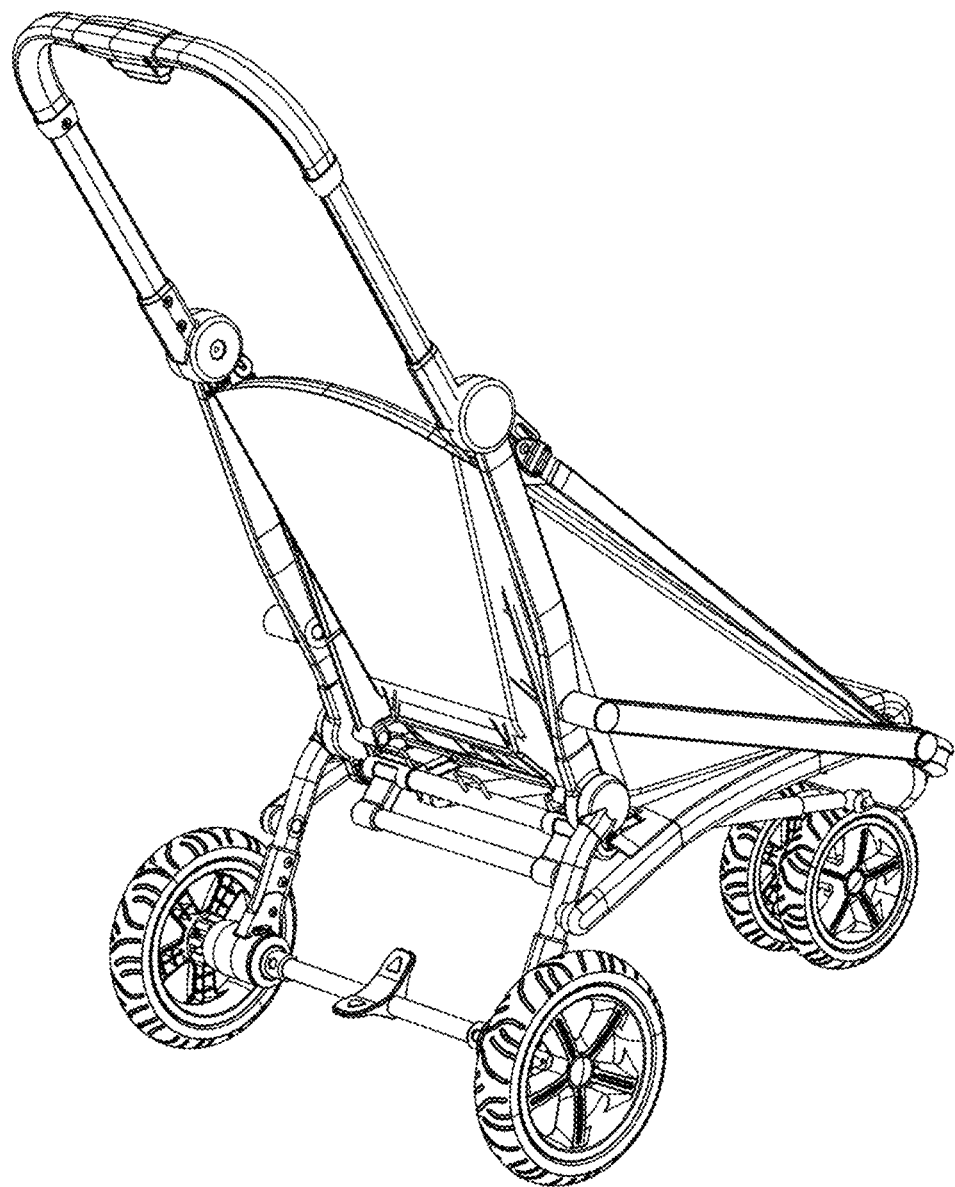
FIG. 6 is a rear isometric perspective view of a delayed-action collapsible stroller device, as contemplated by the present disclosure.
Figure 7:
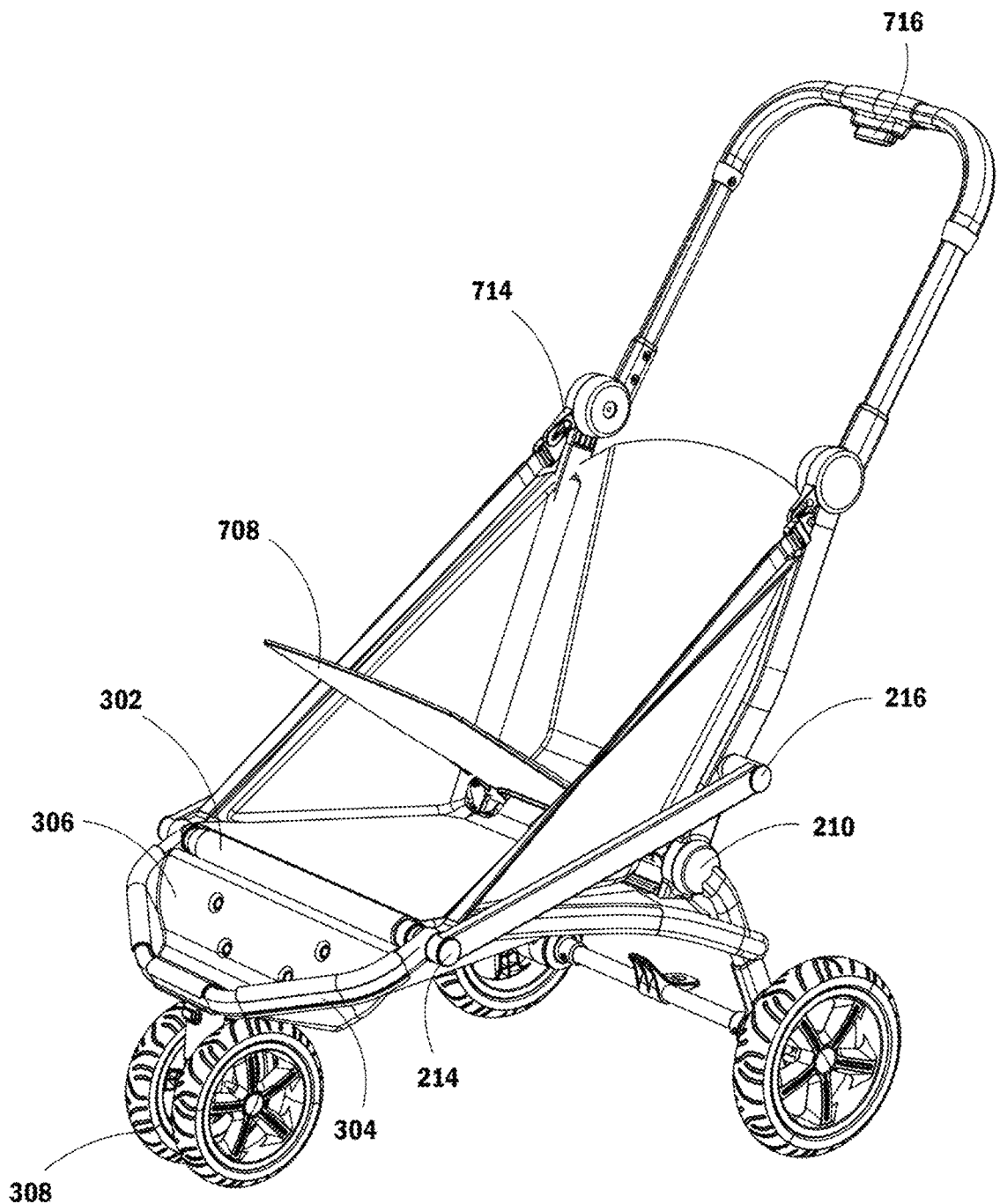
FIG. 7 is a front isometric perspective view of a delayed-action collapsible stroller device, as contemplated by the present disclosure.
Figure 8:
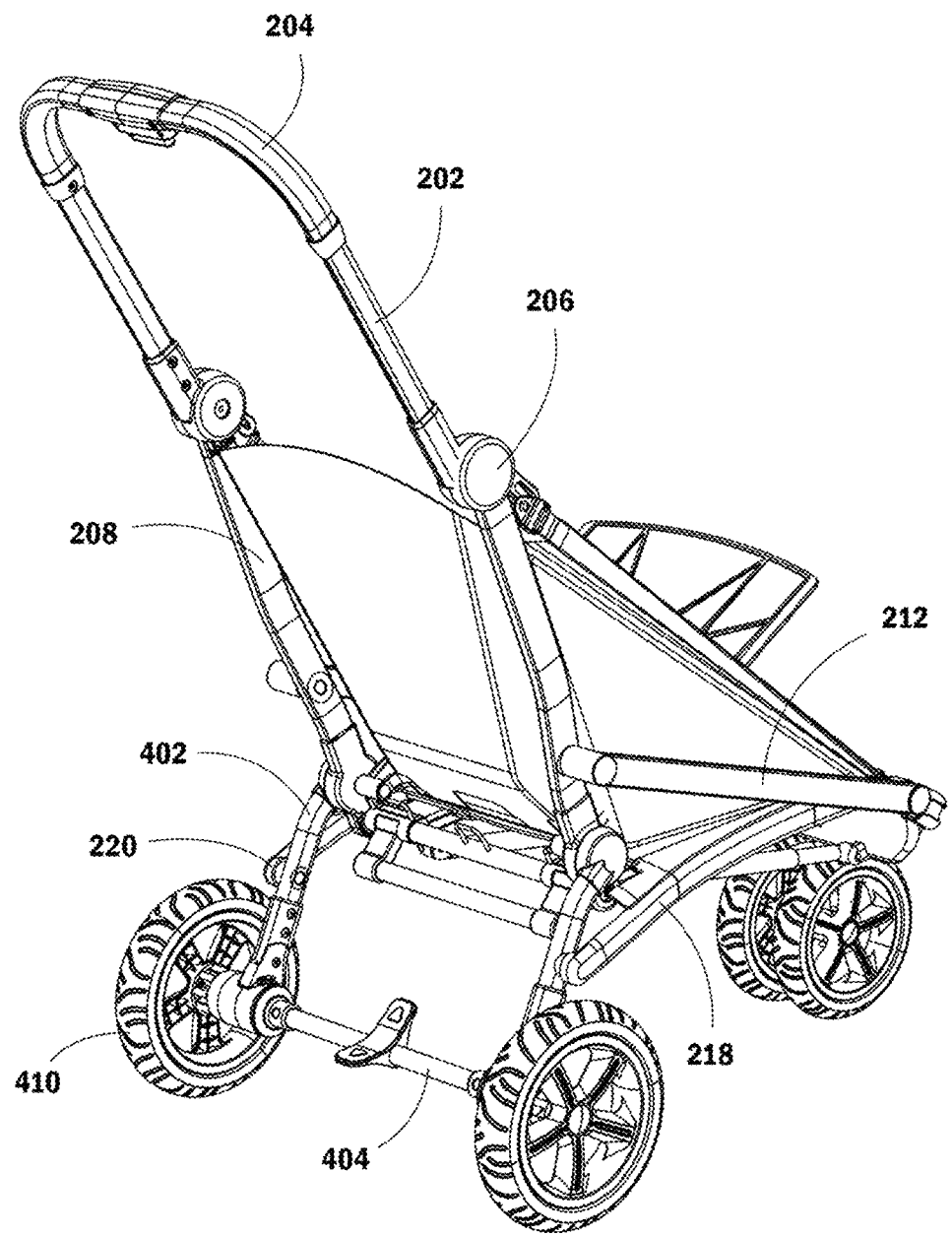
FIG. 8 is a rear isometric perspective view of a delayed-action collapsible stroller device, as contemplated by the present disclosure.
Figure 9:
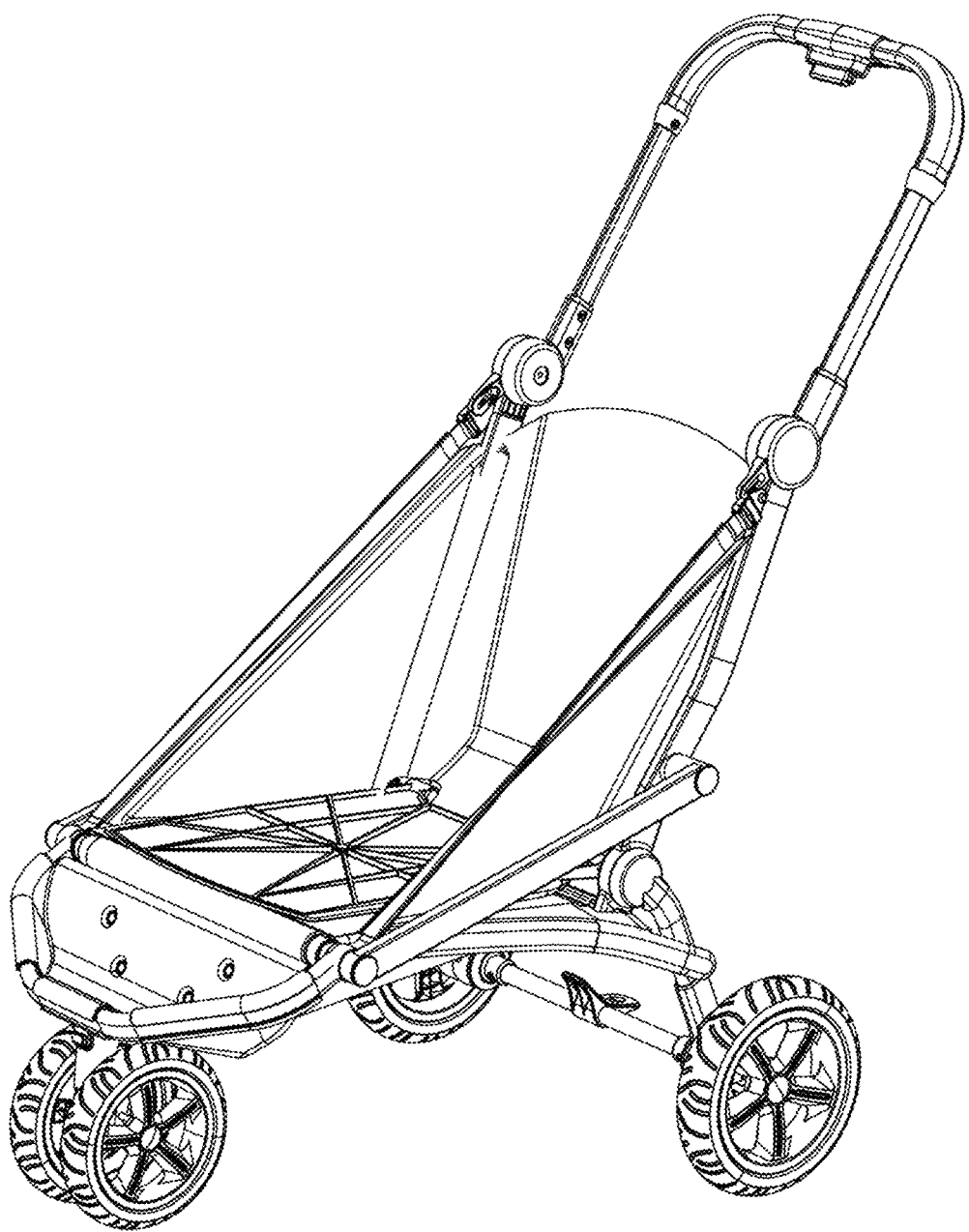
FIG. 9 is a front isometric perspective view of a delayed-action collapsible stroller device, as contemplated by the present disclosure.
Figure 10:
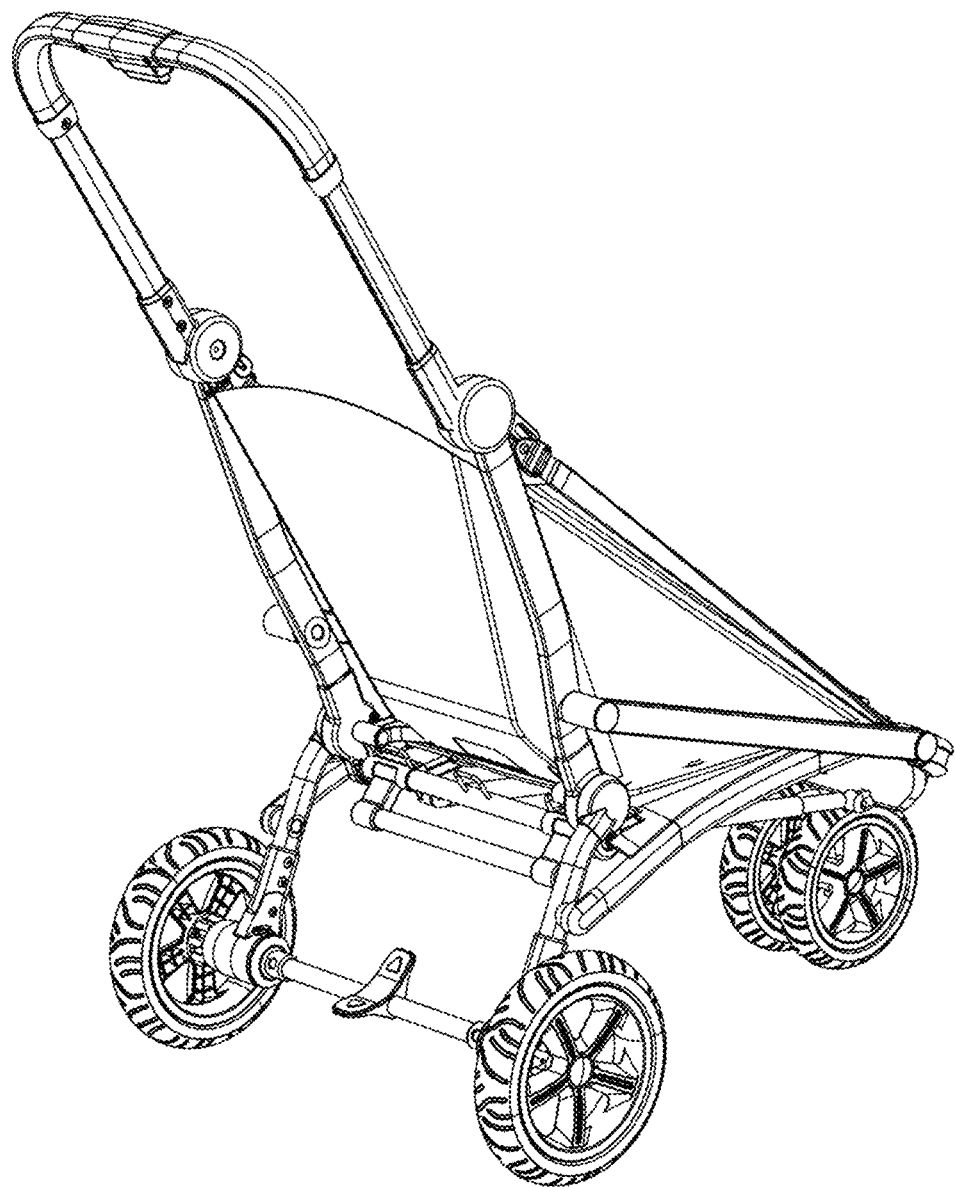
FIG. 10 is a rear isometric perspective view of a delayed-action collapsible stroller device, as contemplated by the present disclosure.
Figure 11:
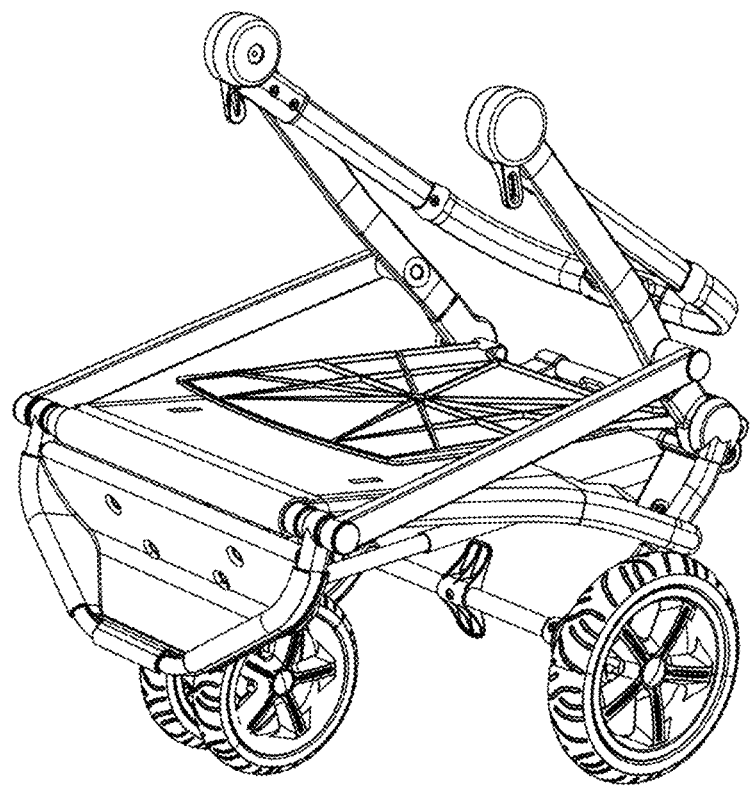
FIG. 11 is a front isometric perspective view of a delayed-action collapsible stroller device in a first partially folded orientation, as contemplated by the present disclosure.
Figure 12:
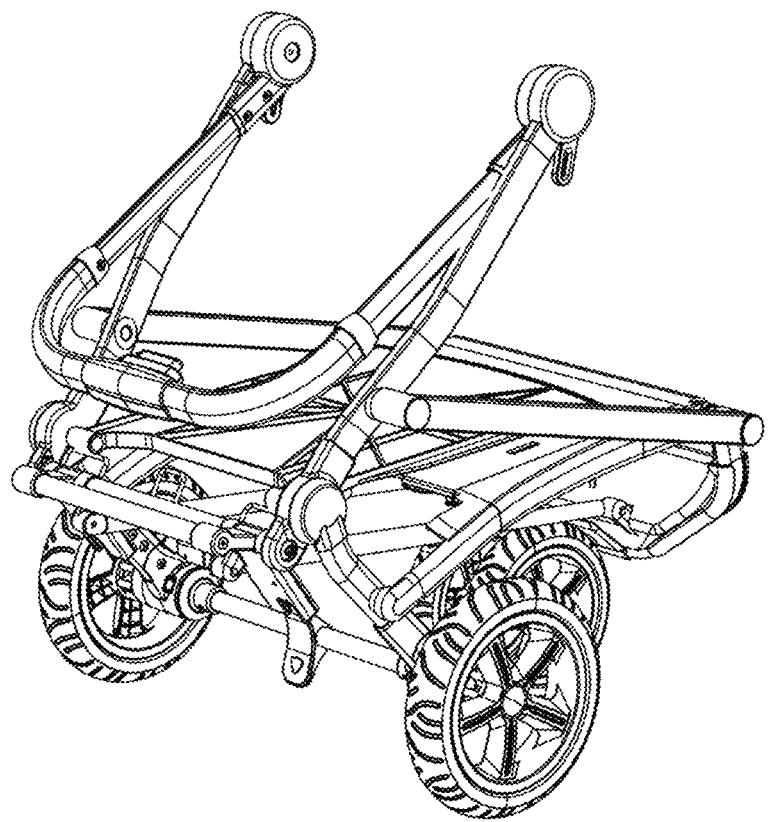
FIG. 12 is a rear isometric perspective view of a delayed-action collapsible stroller device in a first partially folded orientation, as contemplated by the present disclosure.
Figure 13:
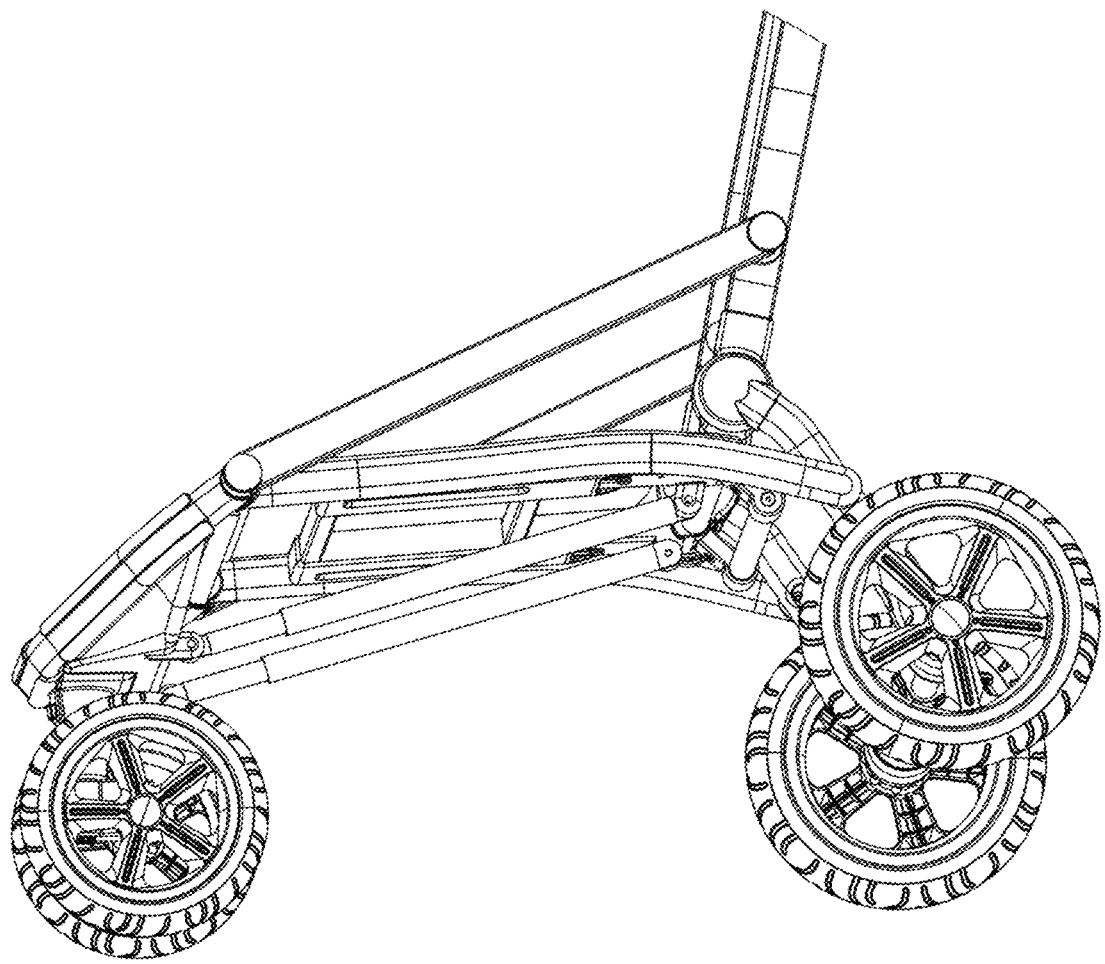
FIG. 13 is a lower isometric perspective view of a delayed-action collapsible stroller device in an unfolded orientation, as contemplated by the present disclosure.
Figure 14:
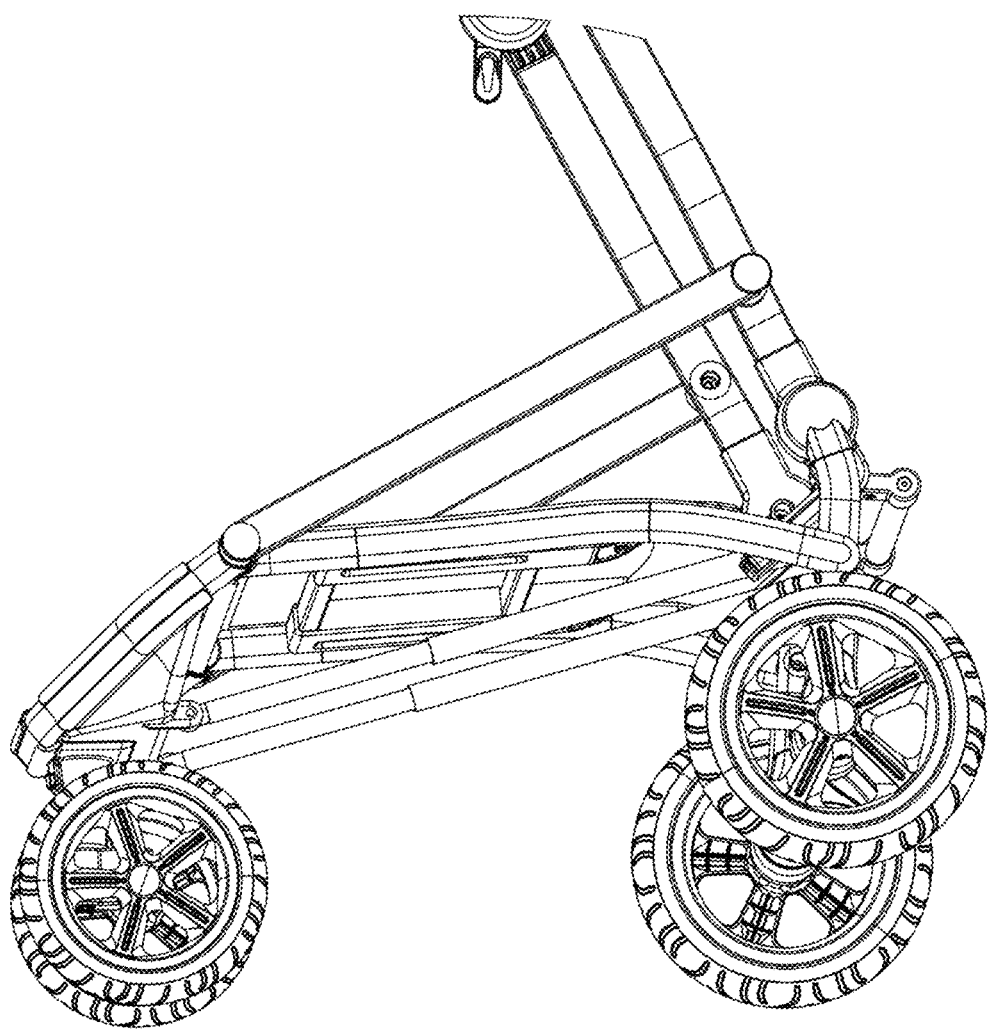
FIG. 14 is a lower isometric perspective view of a delayed-action collapsible stroller device in a first partially folded orientation, as contemplated by the present disclosure.
Figure 15:
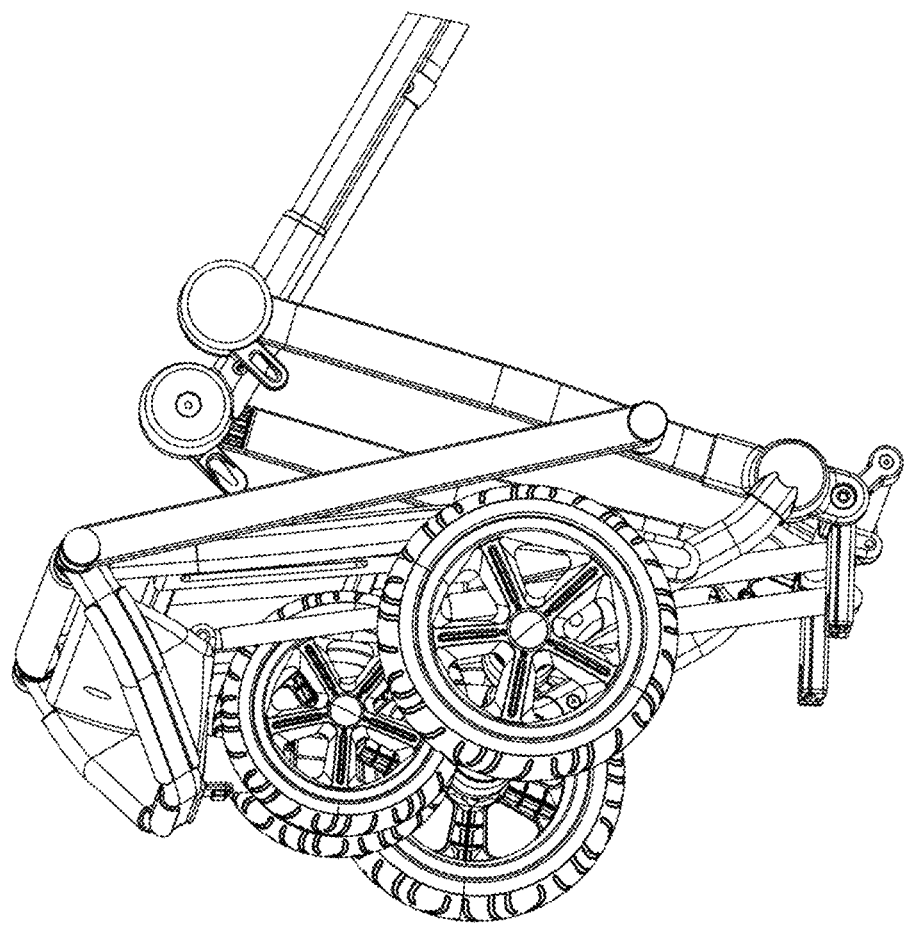
FIG. 15 is a lower isometric perspective view of a delayed-action collapsible stroller device in a second partially folded orientation, as contemplated by the present disclosure.
Figure 16:
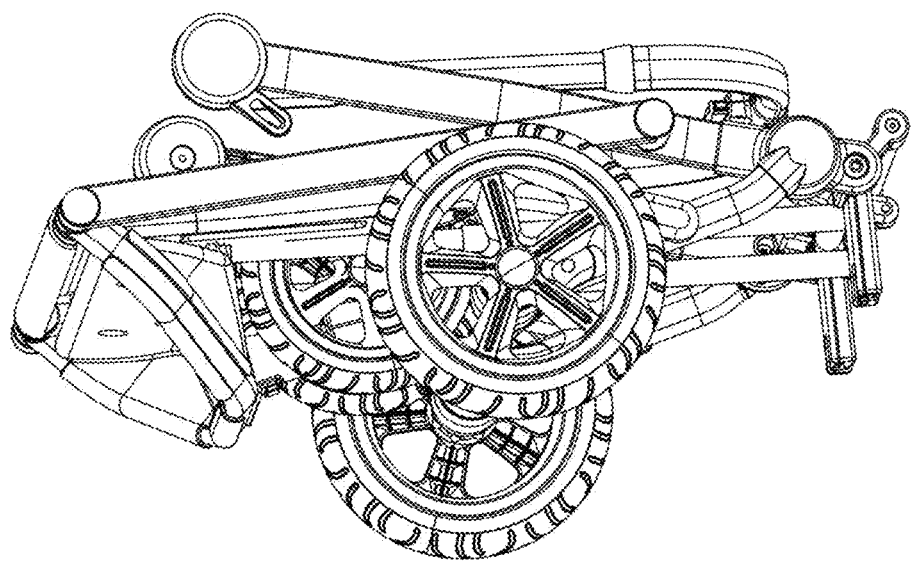
FIG. 16 is a lower isometric perspective view of a delayed-action collapsible stroller device in a third partially folded orientation, as contemplated by the present disclosure.
Figure 17:
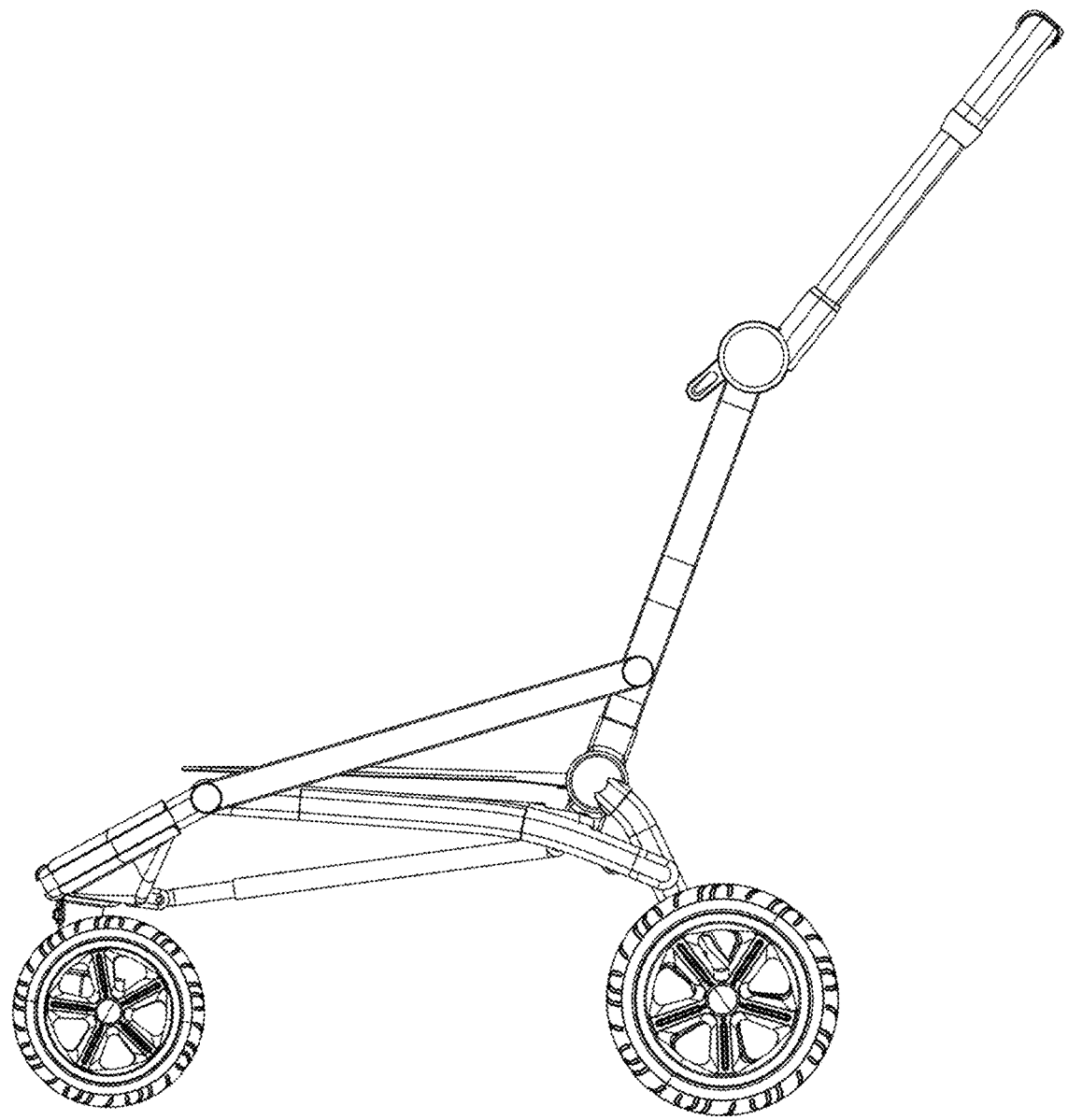
FIG. 17 is a left side elevation view of a delayed-action collapsible stroller device in an unfolded orientation, as contemplated by the present disclosure.
Figure 18:
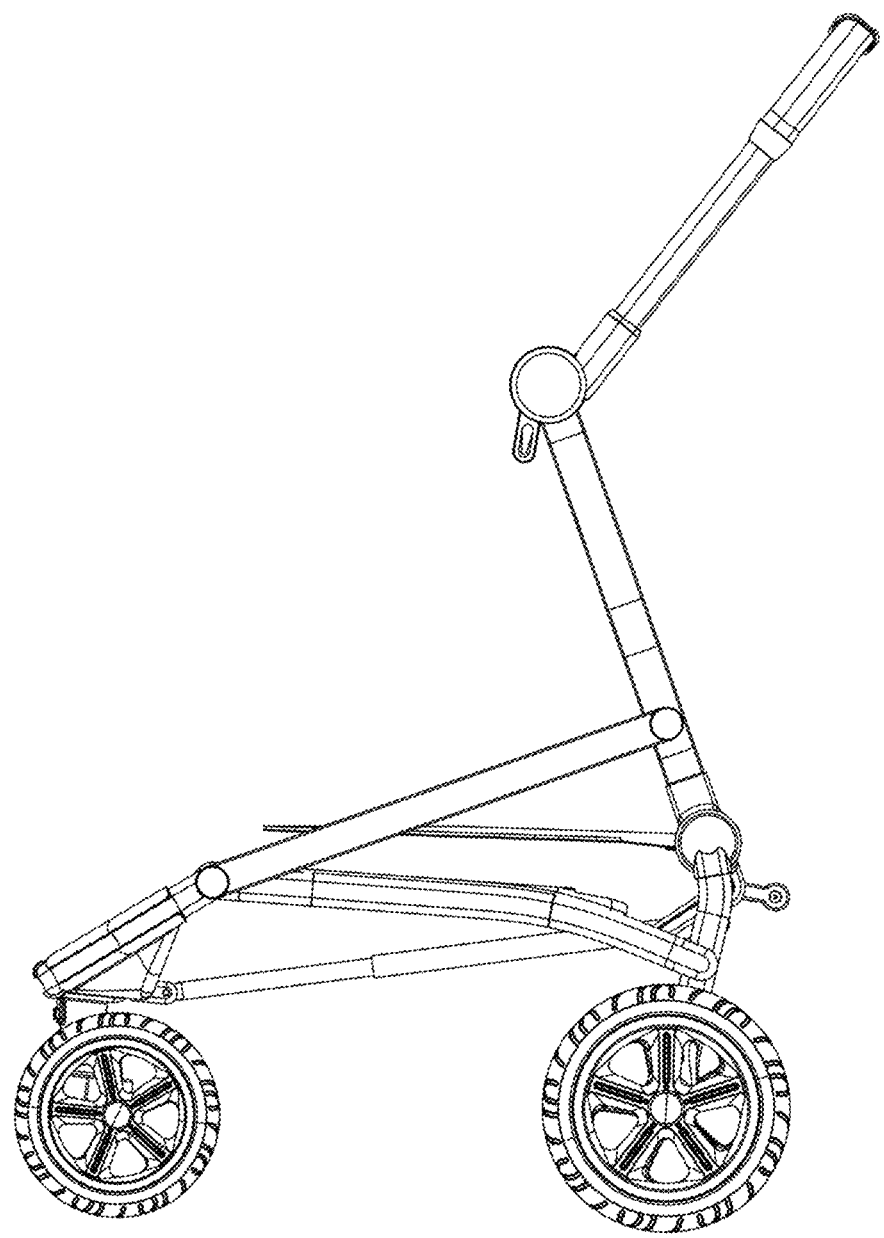
FIG. 18 is a left side elevation view of a delayed-action collapsible stroller device in a first partially folded orientation, as contemplated by the present disclosure.
Figure 19:
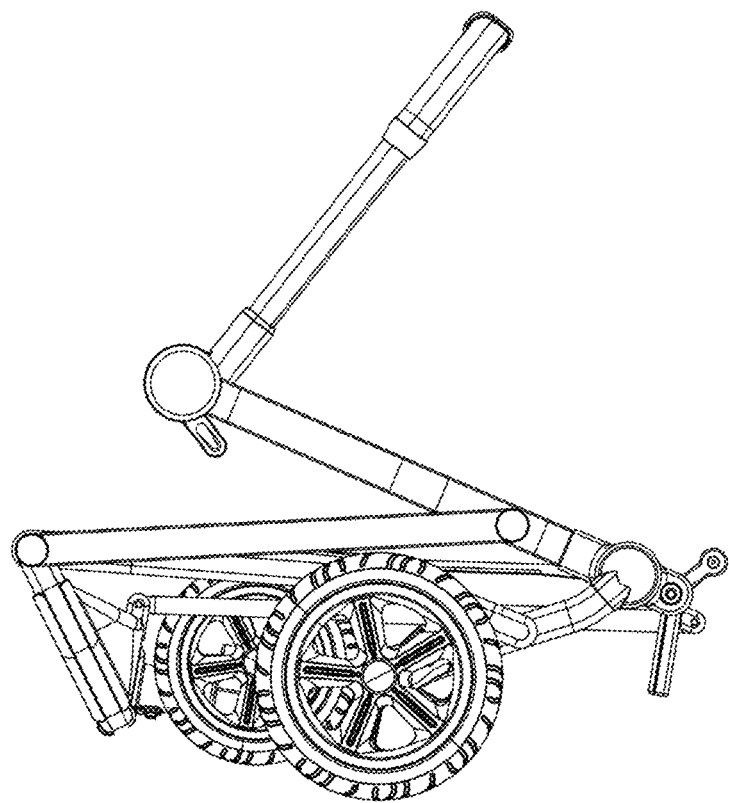
FIG. 19 is a left side elevation view of a delayed-action collapsible stroller device in a second partially folded orientation, as contemplated by the present disclosure.
Figure 20:
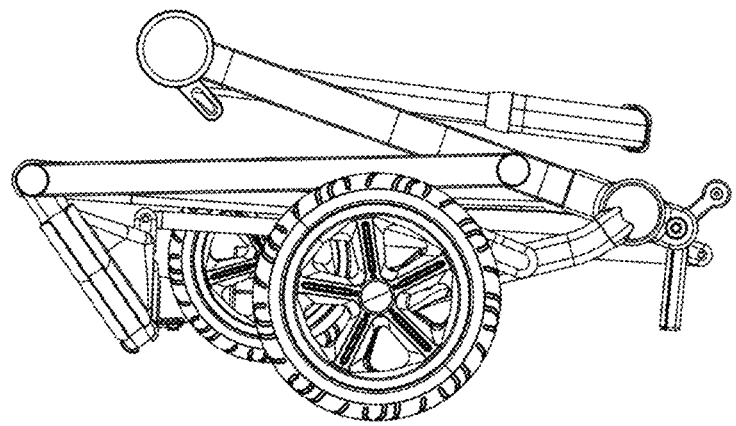
FIG. 20 is a left side elevation view of a delayed-action collapsible stroller device in a third partially folded orientation, as contemplated by the present disclosure.
Figure 21:
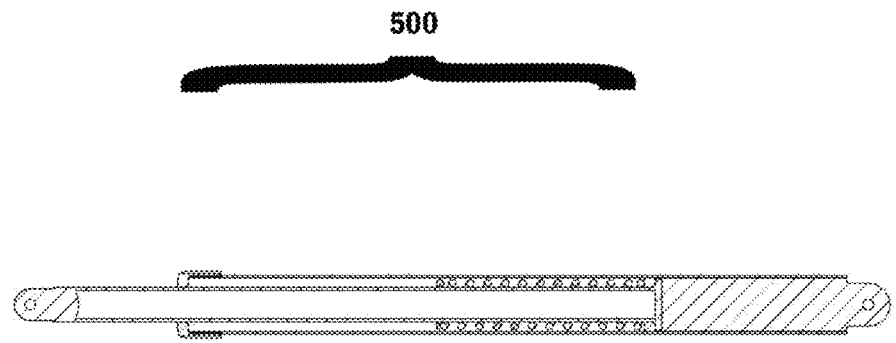
FIG. 21 is a cross-sectional view of a pull rod of a delayed-action collapsible stroller device in a compressed orientation, as contemplated by the present disclosure.
Figure 22:
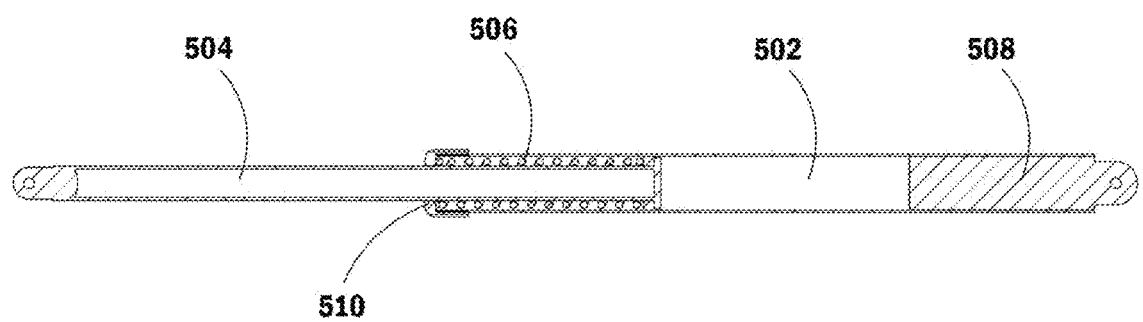
FIG. 22 is a cross-sectional view of a pull rod of a delayed-action collapsible stroller device in an uncompressed orientation, as contemplated by the present disclosure.
Figure 23:
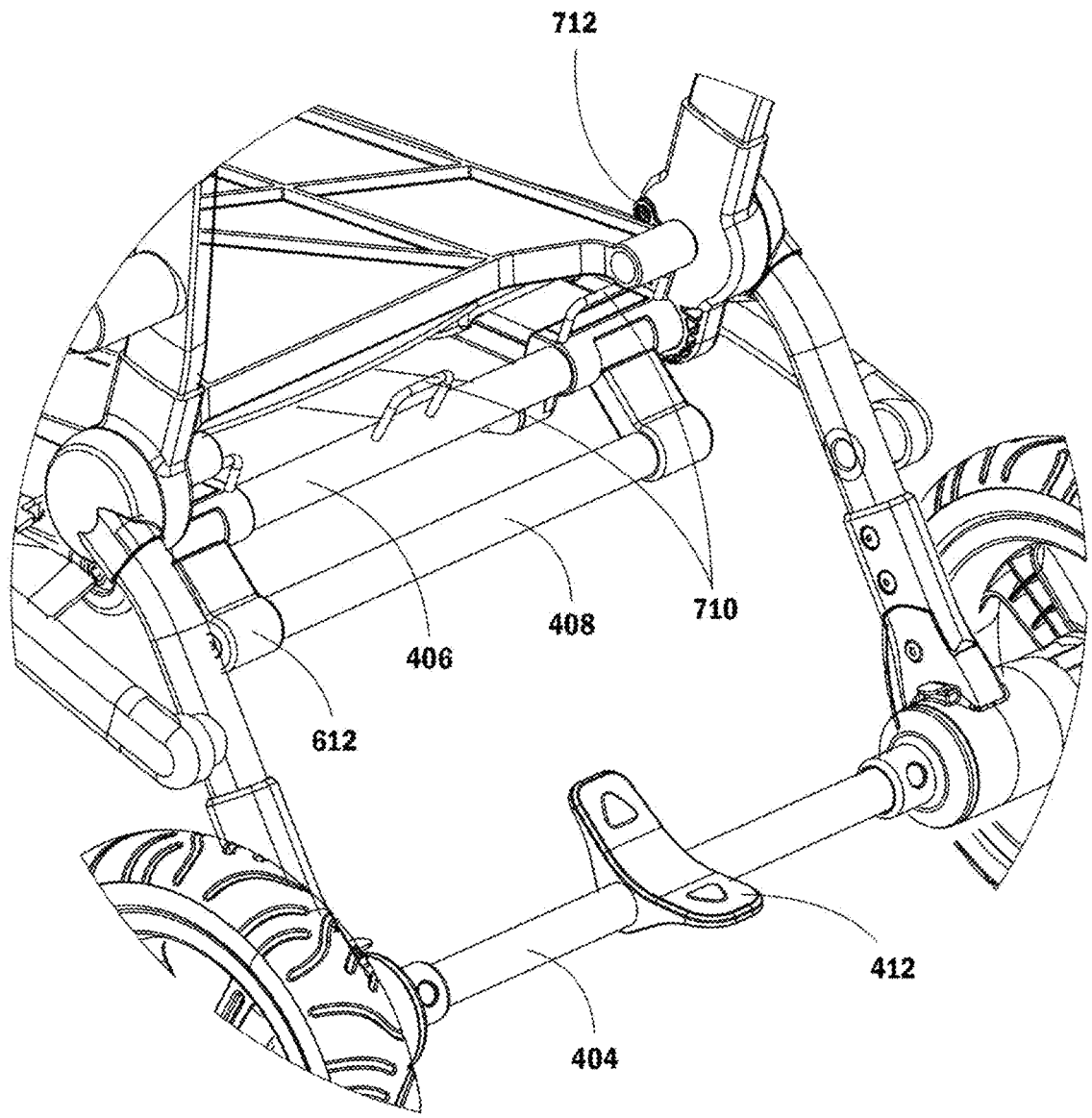
FIG. 23 is a close-up view of a locking bar of a delayed-action collapsible stroller device in an unlocked orientation, as contemplated by the present disclosure.
Figure 24:
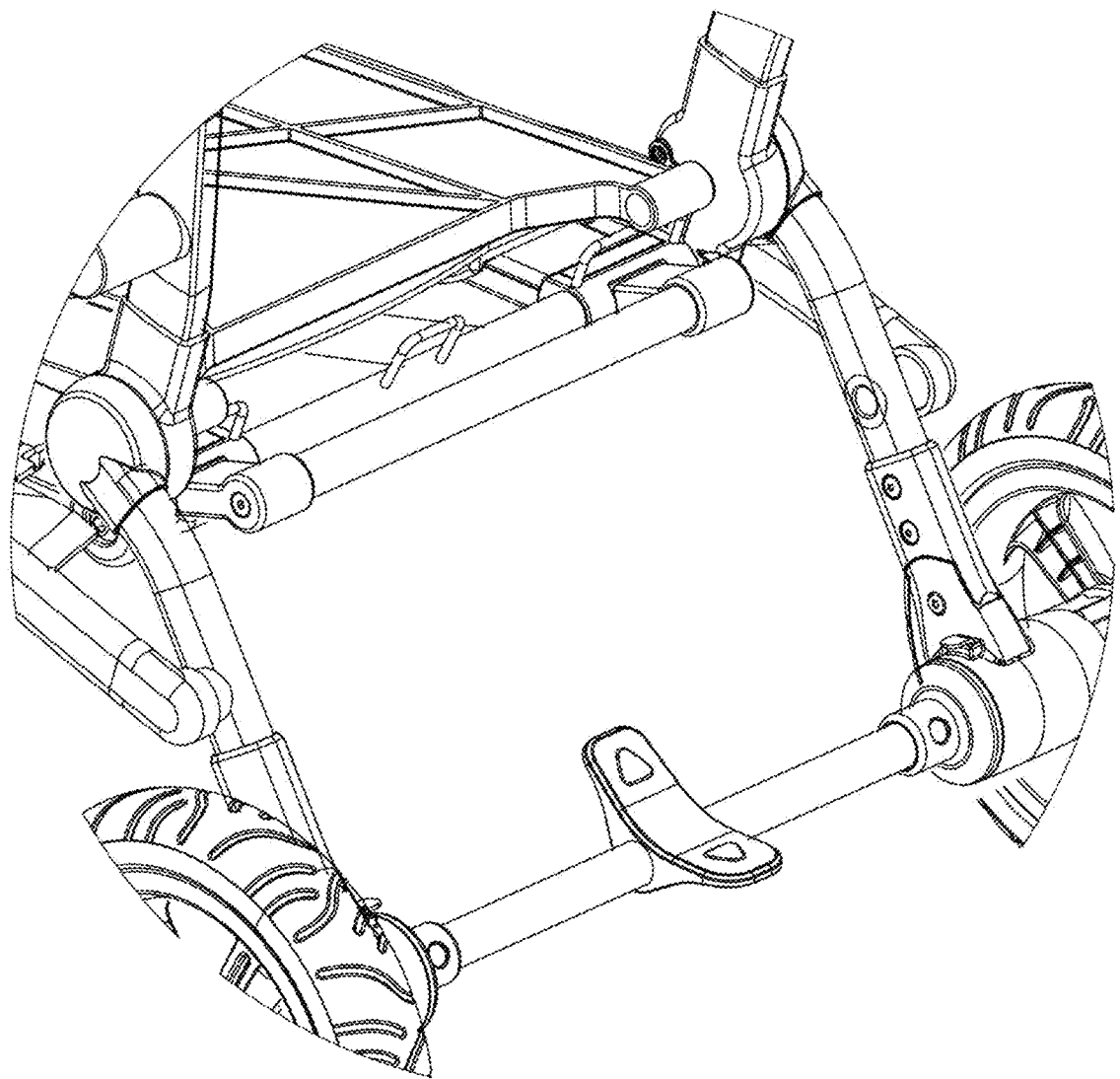
FIG. 24 is a close-up view of a locking bar of a delayed-action collapsible stroller device in a locked orientation, as contemplated by the present disclosure.
Figure 25:
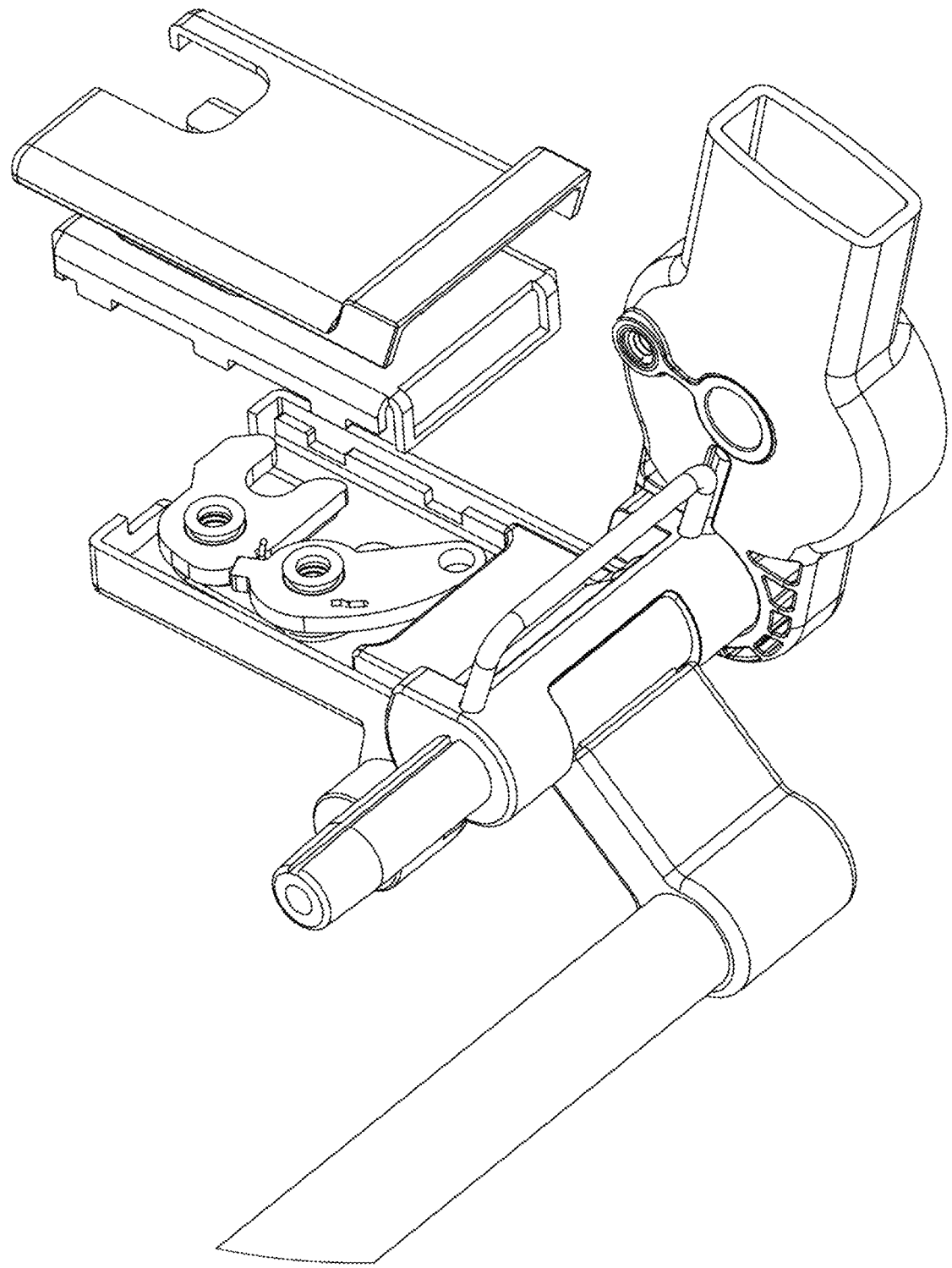
FIG. 25 is a close-up view of a frame lock of a delayed-action collapsible stroller device in an unlocked orientation, as contemplated by the present disclosure.
Figure 26:
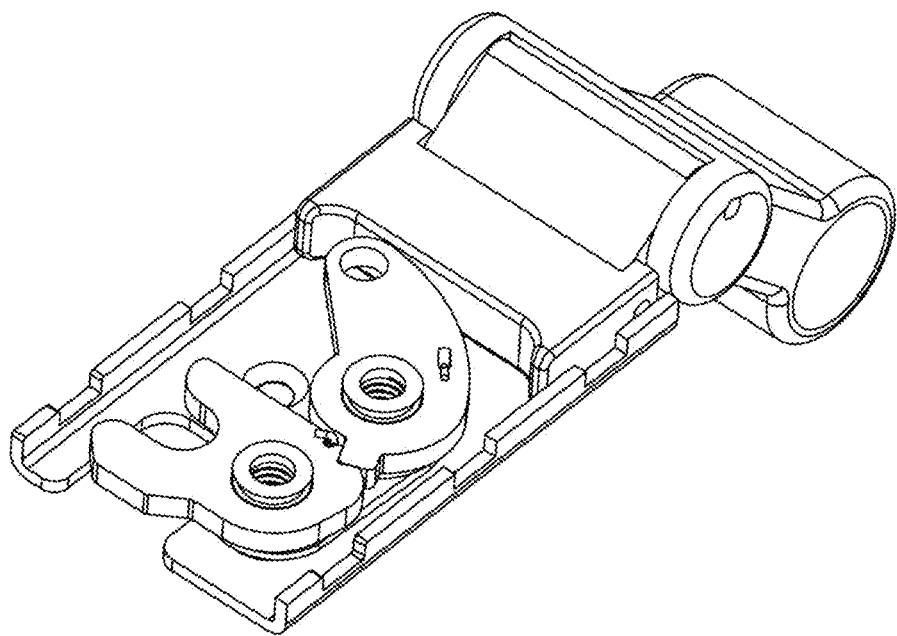
FIG. 26 is a close-up view of a frame lock of a delayed-action collapsible stroller device in an unlocked orientation, as contemplated by the present disclosure.
Figure 27:
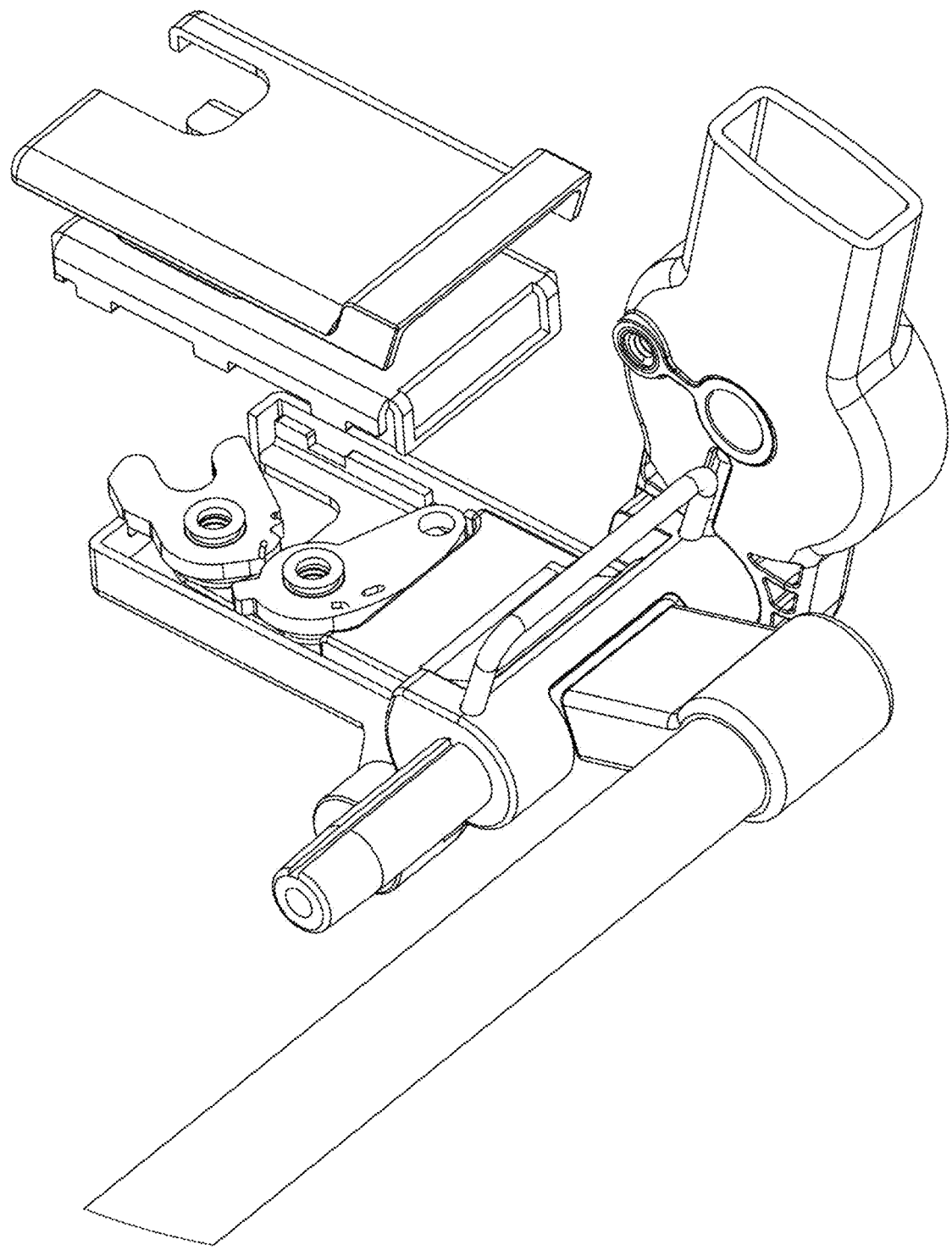
FIG. 27 is a close-up view of a frame lock of a delayed-action collapsible stroller device in a locked orientation, as contemplated by the present disclosure.
Figure 28:
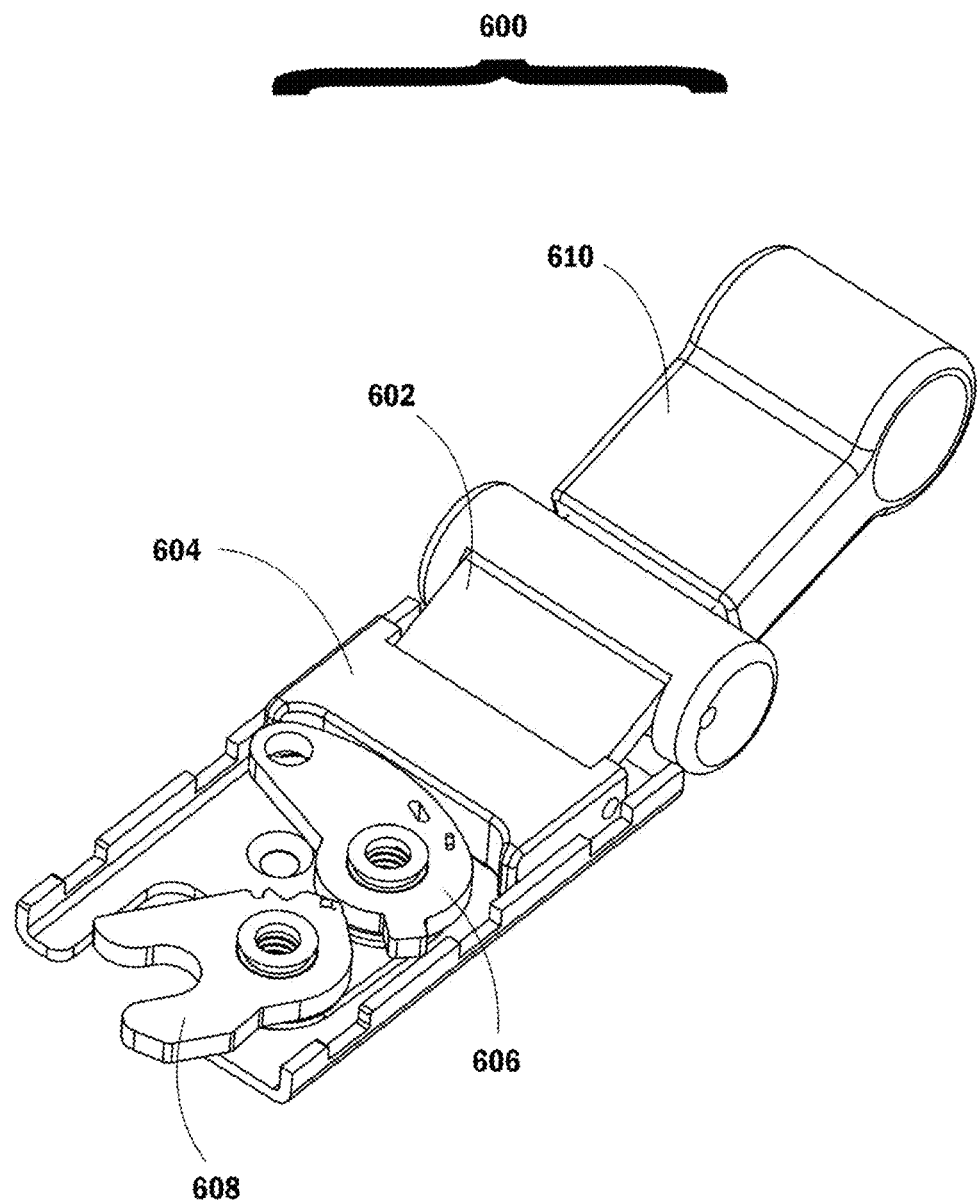
FIG. 28 is a close-up view of a frame lock of a delayed-action collapsible stroller device in a locked orientation, as contemplated by the present disclosure.
Figure 29:
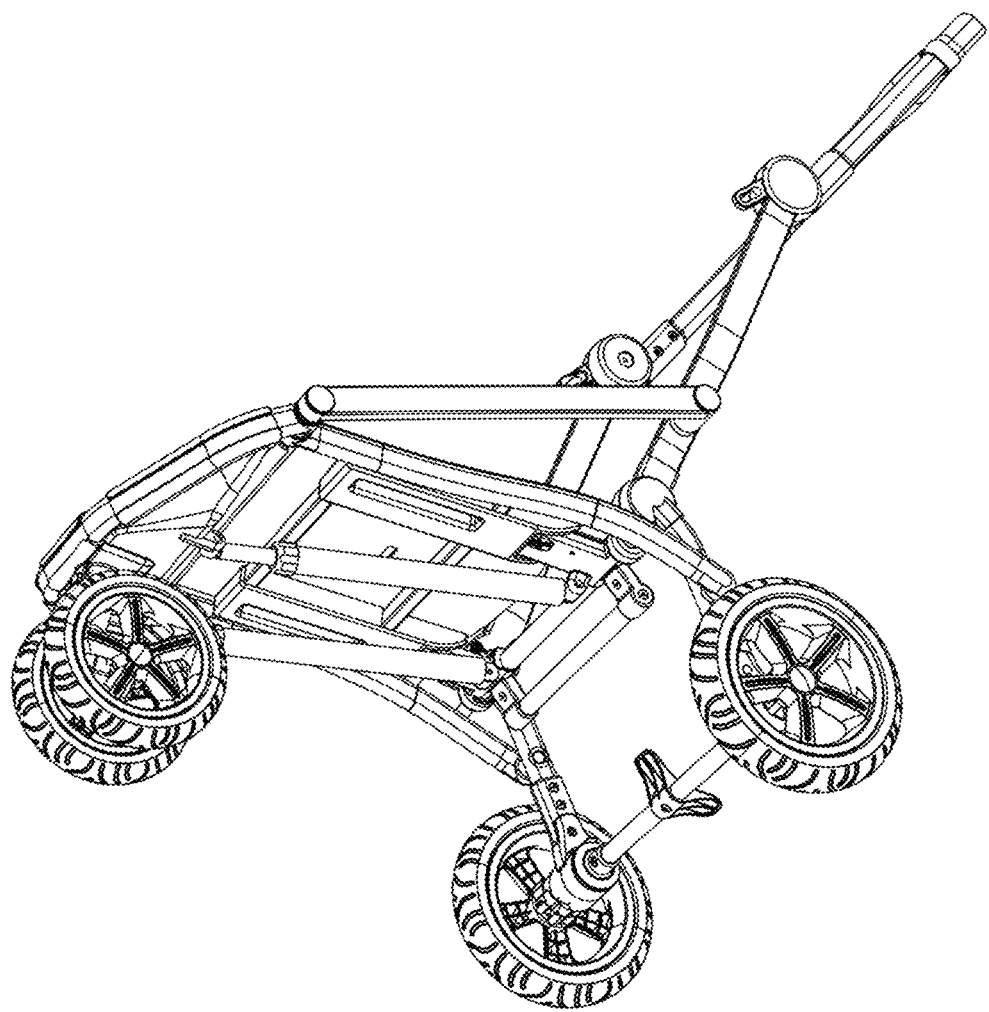
FIG. 29 is a lower isometric perspective view of a delayed-action collapsible stroller device in an unfolded orientation, as contemplated by the present disclosure.
Figure 30:
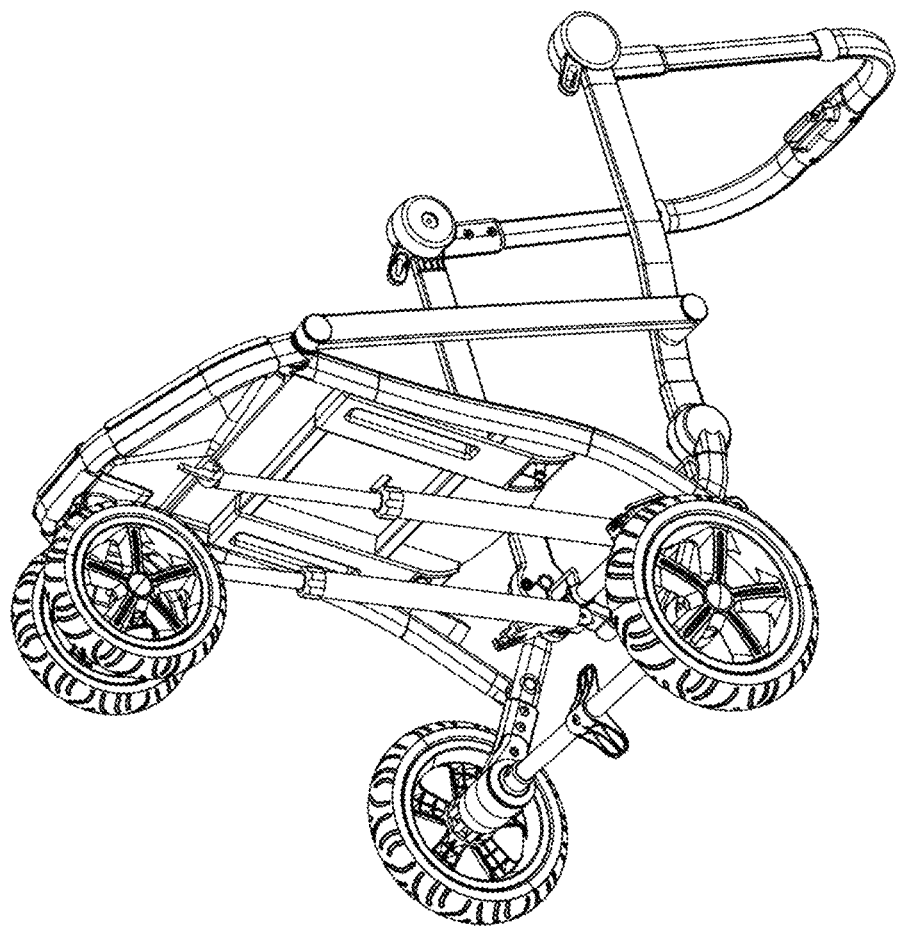
FIG. 30 is a lower isometric perspective view of a delayed-action collapsible stroller device in a first partially folded orientation, as contemplated by the present disclosure.
Figure 31:
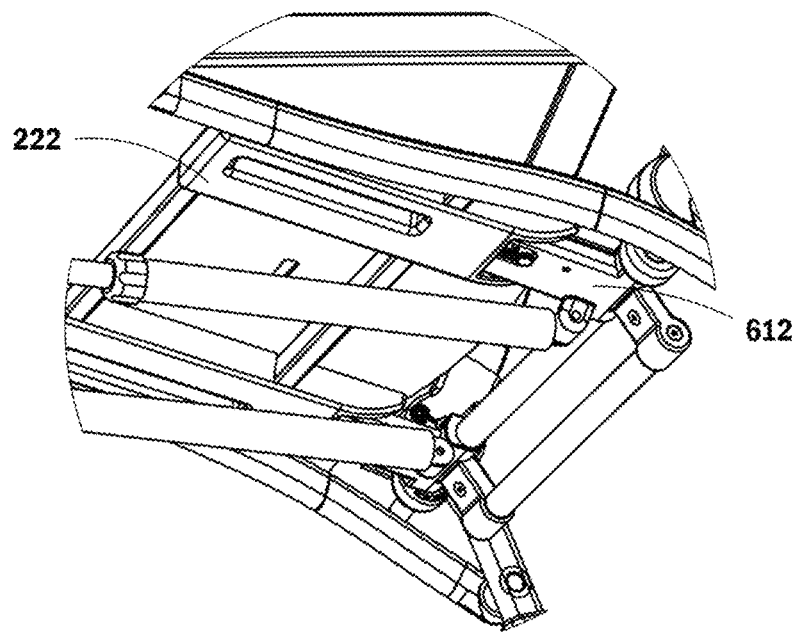
FIG. 31 is a close-up view of a frame lock of a delayed-action collapsible stroller device in a locked orientation, as contemplated by the present disclosure.
Figure 32:
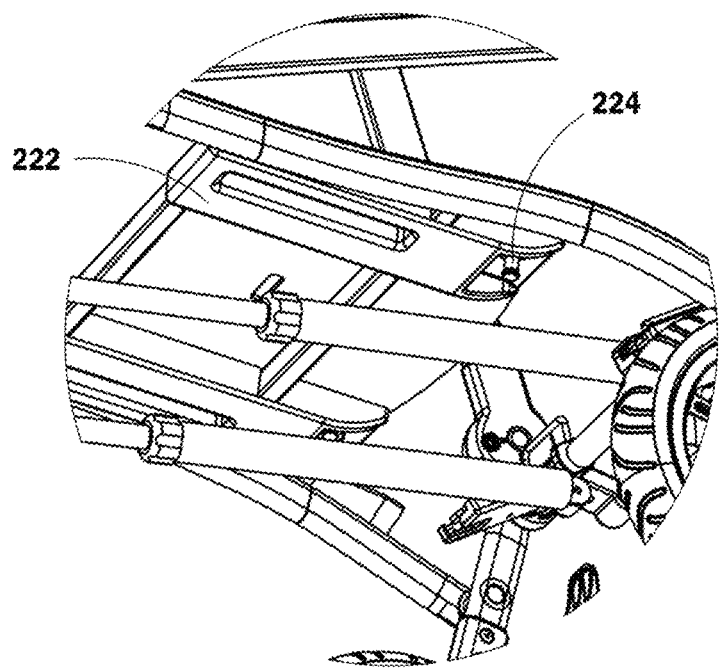
FIG. 32 is a close-up view of a frame lock of a delayed-action collapsible stroller device in an unlocked orientation, as contemplated by the present disclosure.

The illustrations of FIGS. 1-32 illustrate a delayed-action collapsible stroller device, as contemplated by the present disclosure. The device may comprise, generally, a main body 100 comprising a frame 200, a front truck 300, and a rear truck 400.

The frame 200 of the device may comprise any structural frame appropriate to support a seat, seat cushion, or car seat, and may further comprise a foldable or collapsible design that allows the device to fold down into a compact orientation. In one embodiment the frame 200 may comprise a plurality of arms and pivots to allow for such folding. The frame 200 may comprise a plurality of top arms 202, a handle bar 204, a plurality of middle arms 206, a plurality of connecting arms 212, a plurality of fixed arms 218, and a seat frame 222.

The plurality of top arms 202 may comprise any appropriate arms such as, for example, a pair of linear arms, and may each further comprise an upper end and a lower end. The handle bar 204 may comprise any appropriate bar such as, for example, a u-shaped bar, and may further comprise a first end and a second end. The first end of the handle bar 204 may be attached to the upper end of a first top arm 202 and the second end of the handle bar 204 may be attached to the upper end of a second top arm 202. The lower end of each of the top arms 202 may be attached to one of a plurality of upper pivots 206. The upper pivot 206 may comprise any appropriate pivot for allowing a relative movement through a range of motion between two attached components and may further comprise a locking mechanism to prevent relative movement between the two attached components.

The plurality of middle arms 208 may comprise any appropriate arms such as, for example, a pair of linear arms, and may each further comprise an upper end, a middle section, and a lower end. The upper end of each of the middle arms 208 may be attached to one of a plurality of upper pivots 206, and the lower end of each of the middle arms 208 may be attached to one of a plurality of lower pivots 210. The lower pivot 210 may comprise any appropriate pivot for allowing a relative movement through a range of motion between two attached components and may further comprise a locking mechanism to prevent relative movement between the two attached components. The middle section of the middle arms 208 may each further comprise an attachment for one of a plurality of a middle pivots 216. The middle pivot 216 may comprise any appropriate pivot for allowing a relative movement through a range of motion between two attached components.

The plurality of connecting arms 212 may comprise any appropriate arms such as, for example, a pair of linear arms, and may each further comprise a front end and a rear end. The rear end of each of the connecting arms 212 may be attached to one of a plurality of middle pivots 216, and the front end of each of the connecting arms 212 may be attached to one of a plurality of front pivots 214. The front pivot 214 may comprise any appropriate pivot for allowing a relative movement through a range of motion between two attached components.

The plurality of fixed arms 218 may comprise any appropriate arms such as, for example, a pair of linear arms, and may each further comprise a front end, a middle section, and a rear end. The front end of each of the fixed arms 218 may be attached to one of a plurality of front pivots 214, and the rear end of each of the fixed arms 218 may be attached to one of a plurality of rear pivots 220. The rear pivot 220 may comprise any appropriate pivot for allowing a relative movement through a range of motion between two attached components.

The seat frame 222 may comprise any appropriate structural frame such as, for example, a ladder frame to provide structural rigidity to the device, and may further comprise a first side and a second side. The first side of the seat frame 222 may be attached to the middle section of a first fixed arm 218 and the second side of the seat frame 222 may be attached to the middle section of a second fixed arm 218. The seat frame 222 may further comprise a plurality of latch points 224, which may comprise any appropriate mechanism for engaging with a locking or latching component.

The front truck 300 of the device may comprise any structural frame appropriate to attach a wheelset, and may further comprise a foldable or collapsible design that allows the device to fold down into a compact orientation. In one embodiment the front truck 300 may comprise a plurality of arms and pivots to allow for such folding. The front truck 300 may comprise a front crossbar 302 and a front arm 304.

The front crossbar 302 may comprise any appropriate arm such as, for example, a linear arm, and may further comprise a first end and a second end. The first end of the front crossbar 302 may be attached to a first front pivot 214 and the second end of the front crossbar 302 may be attached to a second front pivot 214.

The front arm 304 may comprise any appropriate arm such as, for example, a u-shaped bar, and may further comprise a first end and a second end. The first end of the front arm 304 may be attached to a first front pivot 214 and the second end of the front arm 304 may be attached to a second front pivot 214.

The front truck 300 may further comprise a footrest 306, which may comprise any appropriate structure suitable for receiving and supporting the feet of a user sitting in the device.

The front truck 300 may further comprise a front wheelset 308, which may comprise a plurality of wheels rotatably attached to the front truck 300 such that they may serve to steer the device. The front wheelset 308 may further comprise a locking mechanism to prevent steering of the device.

The rear truck 400 of the device may comprise any structural frame appropriate to attach a wheelset, and may further comprise a foldable or collapsible design that allows the device to fold down into a compact orientation. In one embodiment the rear truck 400 may comprise a plurality of arms and pivots to allow for such folding. The rear truck 400 may comprise a plurality of rear arms 402, a rear axle 404, a rear crossbar 406, and a locking bar 408.

The plurality of rear arms 402 may comprise any appropriate arms such as, for example, a pair of linear arms, and may each further comprise an upper end, a middle section, and a lower end. The upper end of each of the rear arms 402 may be attached to one of a plurality of lower pivots 210. The middle section of the rear arms 402 may each further comprise an attachment for one of a plurality of a rear pivots 220.

The rear axle 404 may comprise any appropriate arm such as, for example, a linear arm, and may further comprise a first end and a second end. The first end of the rear axle 404 may be attached to a first rear arm 402 and the second end of the rear axle 404 may be attached to a second rear arm 402.

The rear crossbar 406 may comprise any appropriate arm such as, for example, a linear arm, and may further comprise a first end and a second end. The first end of the rear crossbar 406 may be attached to a first lower pivot 210 and the second end of the rear crossbar 406 may be attached to a second lower pivot 210.

The locking bar 408 may comprise any appropriate arm such as, for example, a linear arm, and may further comprise a first end and a second end. The first end of the locking bar 408 may be attached via a first locking arm 610 to the rear crossbar 406 and the second end of the locking bar 408 may be attached via a second locking arm 610 to the rear crossbar 406.

The rear truck 400 may further comprise a rear wheelset 410, which may comprise a plurality of wheels rotatably attached to the rear truck 400 such that they may serve to allow the device to roll. The rear truck 400 may further comprise a foot brake 412, which may comprise any appropriate braking mechanism suitable for preventing the rolling of the rear wheelset 410.

The delayed-action collapsible stroller device may further comprise a pull rod 500, which may comprise an extendable rod designed to delay the articulating action of the device to allow for more compact folding. The pull rod 500 may comprise a rod housing 502, a piston 504, a spring 506, and a stopper 508.

The rod housing 502 may comprise any appropriate housing such as, for example, a hollow cylinder having an open end and a closed end. The closed end of the rod housing 502 may further comprise a mounting point attached to the rear crossbar 406 or the seat frame 222. The piston 504 may comprise any appropriate piston such as, for example, a rod having an outer end and a lipped end. The outer end of the piston 504 may comprise a mounting point attached to the front truck 300.

The spring 506 may comprise any appropriate spring having a compression attribute. The spring 506 may be placed around the piston 504 against the lipped end of the piston 504, and this combination may then be placed within the rod housing 502. The piston 504 may pass through a spring cap 510, which may comprise any cap closing the open end of the housing 504 and containing the spring 506 therein. The closed end of the rod housing 502 may further comprise a stopper 508, which may comprise a solid component within the rod housing 502 limiting the range of motion of the piston 504.

By this design the pull rod 500 may comprise a compressed orientation and an extended orientation. In a compressed orientation the lipped end of the piston 504 may abut against the stopper 508 within the rod housing 502, thus limiting the maximum compression of the pull rod 500. In an extended orientation the spring 506 may be compressed between the spring cap 510 and the lipped end of the piston 504, thus limiting the maximum extension of the pull rod 500. The articulation of the front truck 300 occurs when the pull rod 500 is in its extended orientation, and the travel of the pull rod 500 from its compressed orientation to its extended orientation causes a delay in the articulation of the front truck 300 relative to the folding of the remainder of the device.

The delayed-action collapsible stroller device may further comprise a plurality of frame locks 600, which may comprise a primary locking mechanism to prevent the folding of the device. The plurality of frame locks 600 may further comprise a plurality of linkages 602, a plurality of slide blocks 604, a plurality of cams 606, and a plurality of latches 608.

The locking bar 408 may be manipulated between a locked orientation and an unlocked orientation, and this manipulation may actuate the plurality of locking arms 610. The plurality of linkages 602 may each comprise a physical connection between one each of the plurality of locking arms 610 and one each of the plurality of slide blocks 604. By this mechanism the manipulation of the locking bar 408 causes a movement of the plurality of slide blocks 604.

The plurality of cams 606 may comprise any appropriate spring-loaded mechanism for converting the linear movement of the plurality of slide blocks 604 into rotational movement. The plurality of latches 608 may comprise any appropriate spring-loaded mechanism for engaging the plurality of latch points 224 of the seat frame 222. The rotation of one each of the plurality of cams 606 causes the rotation of one each of the plurality of latches 608 around one each of the plurality of latch points 224 to lock the device in its unfolded orientation.

The plurality of frame locks 600 may further comprise a plurality of lock covers 612, which may comprise any appropriate covers suitable for covering and protecting the mechanism of the plurality of frame locks 600.

The delayed-action collapsible stroller device may further comprise a hood 702, which may comprise a cover for protecting a user seated in the device from sun or rain.

The delayed-action collapsible stroller device may further comprise a seat 704, which may comprise a cushioned sitting area for a user seated in the device.

The delayed-action collapsible stroller device may further comprise a harness 706, which may comprise a seatbelt mechanism for securing a user seated in the device.

The delayed-action collapsible stroller device may further comprise a seat base 708, which may comprise a reinforced base for supporting the seat 704.

The delayed-action collapsible stroller device may further comprise a plurality of standard mounts 710, which may comprise any appropriate mechanism for receiving a standard or proprietary stroller seat. The plurality of standard mounts 710 may comprise any appropriate reversible attachment mechanism. In one embodiment the plurality of standard mounts 710 may comprise standardized car seat mounts based on American or European standards.

The delayed-action collapsible stroller device may further comprise a plurality of hard points 712, which may comprise mounting points for standardized golf cart seatbelt components.

The delayed-action collapsible stroller device may further comprise a plurality of seat sling attachments 714, which may comprise mounting points for fabric slings of the seat 704.

The delayed-action collapsible stroller device may further comprise a handle release 716, which may comprise a cable release for disengaging the locks of the various pivots of the device and allow for the frame 200 to be collapsed.

The delayed-action collapsible stroller device may further comprise a storage system, which may comprise any system appropriate for providing storage areas within or on the device.

To begin collapsing the delayed-action collapsible stroller device a user may first engage the handle release 716 to allow the various pivots of the device to unlock and actuate the locking bar 408 to release the latch 608 of the frame lock 600 from the latch point 224. The user may then collapse the plurality of top arms 202 rearward around the plurality of upper pivots 206 relative to the plurality of middle arms 208. The attachment of the plurality of connecting arms 212 to the middle sections of the plurality of middle arms 208 causes the upper ends of the plurality of middle arms 208 to articulate forward while the lower ends of the plurality of middle arms 208 articulate rearward. This movement causes the plurality of rear arms 402 to articulate forward around the plurality of rear pivots 220, and the movement of the plurality of rear arms 402 articulates the rear truck 400 forward while also extending the pull rod 500. Once the pull rod 500 has extended to its maximum length it then causes the front truck 300 to articulate rearward until the device has achieved its fully collapsed orientation.

The delayed-action collapsible stroller device may be substantially assembled by any appropriate mechanism known in the art. By way of example, the various components of the device may be attached to one another, as contemplated by the present disclosure, by screwing, gluing, welding, adhering, interlocking, clasping, binding, nailing, or any other appropriate mechanism.

The delayed-action collapsible stroller device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the delayed-action collapsible stroller device may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one embodiment the material of construction may vary from one component to the next within the system.

In one embodiment the delayed-action collapsible stroller device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A delayed-action collapsible stroller device, comprising:
   a stroller frame;
   a front truck;
   a rear truck;
   a plurality of pull rods; and
   a plurality of frame locks;
   wherein said stroller frame further comprises a plurality of top arms, a handle bar, a plurality of upper pivots, a plurality of middle arms, a plurality of lower pivots, a plurality of connecting arms, a plurality of front pivots, a plurality of middle pivots, a plurality of fixed arms, a plurality of rear pivots, a seat frame, and a plurality of latch points;

wherein said front truck further comprises a front crossbar, a plurality of front arms, and a front wheelset;

wherein said rear truck further comprises a plurality of rear arms, a rear axle, a rear crossbar, a locking bar, and a rear wheelset;

wherein said plurality of pull rods further comprise a plurality of rod housings, a plurality of pistons, a plurality of springs, a plurality of stoppers, and a plurality of spring caps; and wherein said plurality of frame locks further comprise a plurality of linkages, a plurality of slide blocks, a plurality of cams, a plurality of latches, a plurality of locking arms, and a plurality of lock covers.

2. The invention of claim 1, wherein said plurality of top arms further comprise an upper end and a lower end;

wherein said handle bar further comprises a first end and a second end;

wherein said plurality of middle arms further comprise an upper end, a middle section, and a lower end;

wherein said plurality of connecting arms further comprise a front end and a rear end;

wherein said plurality of fixed arms further comprise a front end, a middle section, and a rear end;

wherein said seat frame further comprises a ladder frame;

wherein said first side of said handle bar is attached to said upper end of a first top arm and said second side of said handle bar is attached to said upper end of a second top arm;

wherein said lower end of said first top arm is attached to a first upper pivot and said lower end of said second top arm is attached to a second upper pivot;

wherein said upper end of a first middle arm is attached to said first upper pivot and said upper end of a second middle arm is attached to said second upper pivot;

wherein said lower end of said first middle arm is attached to a first lower pivot and said lower end of said second middle arm is attached to a second lower pivot;

wherein said front end of a first connecting arm is attached to a first front pivot and said front end of a second connecting arm is attached to a second front pivot;

wherein said rear end of said first connecting arm is attached to a first middle pivot and said rear end of said second connecting arm is attached to a second middle pivot;

wherein said first middle pivot is attached to said middle section of said first middle arm and said second middle pivot is attached to said middle section of said second middle arm;

wherein said front end of a first fixed arm is attached to said first front pivot and said front end of a second fixed arm is attached to said second front pivot;

wherein said rear end of said first fixed arm is attached to a first rear pivot and said rear end of said second fixed arm is attached to a second rear pivot;

wherein a first side of said seat frame is attached to said middle section of said first fixed arm and a second side of said seat frame is attached to said middle section of said first fixed arm; and wherein said plurality of latch points are attached to said seat frame.

3. The invention of claim 2, wherein said front crossbar further comprises a first end and a second end;

wherein said plurality of front arms further comprise a first end and a second end;

wherein said first end of said front crossbar is attached to said first front pivot and said second end of said front crossbar is attached to said second front pivot; and wherein said first end of said front arm is attached to said first front pivot and said second end of said front arm is attached to said a second front pivot.

4. The invention of claim 3, wherein said plurality of rear arms further comprise an upper end, a middle section, and a lower end;

wherein said rear axle further comprises a first end and a second end;

wherein said rear crossbar further comprises a first end and a second end;

wherein said locking bar further comprises a first end and a second end;

wherein said upper end of a first rear arm is attached to said first lower pivot and said upper end of a second rear arm is attached to said second lower pivot;

wherein said lower end of said first rear arm is attached to said first end of said rear axle and said lower end of said second rear arm is attached to said second end of said rear axle; and wherein said first end of said rear crossbar is attached to said first lower pivot and said second end of said rear crossbar is attached to said second lower pivot.

5. The invention of claim 4, wherein said plurality of rod housings further comprise an open end and a closed end;

wherein said plurality of pistons further comprise an outer end and a lipped end;

wherein a first spring is installed around a first piston within a first rod housing;

wherein a first spring cap is attached to said open end of a first rod housing and a first stopper is attached to said closed end of a first rod housing;

wherein a second spring is installed around a second piston within a second rod housing;

wherein a second spring cap is attached to said open end of a second rod housing and a second stopper is attached to said closed end of a second rod housing;

wherein said outer end of said first piston is attached to said front truck and said closed end of said first rod housing is attached to said stroller frame; and wherein said outer end of said second piston is attached to said front truck and said closed end of said second rod housing is attached to said stroller frame.

6. The invention of claim 5, further comprising:

wherein said first end of said locking bar is attached to a first locking arm and said second end of said locking bar is attached to a second locking arm;

wherein said first locking arm is attached to a first linkage and a said second locking arm is attached to a second linkage;

wherein said first linkage is attached to a first slide block and said second linkage is attached to a second slide block;

wherein said first slide block reversibly engages a first cam and a first latch; and wherein said second slide block reversibly engages a second can and a second latch.

7. The invention of claim 6, further comprising:

a footrest.

8. The invention of claim 7, further comprising:
a foot brake.

9. The invention of claim 8, further comprising:
a hood.

10. The invention of claim 9, further comprising:
a seat.

11. The invention of claim 10, further comprising:
a harness.

12. The invention of claim 11, further comprising:
a seat base.

13. The invention of claim 12, further comprising: a plurality of standard-seat mounts.

14. The invention of claim 13, further comprising:
a plurality of hard points.

15. The invention of claim 14, further comprising:
a plurality of sling attachments.

16. The invention of claim 15, further comprising:
a handle release.

17. The invention of claim 16, further comprising:
a storage area.

\* \* \* \* \*